US 7,010,246 B2

(12) United States Patent
Fujishiro et al.

(10) Patent No.: US 7,010,246 B2
(45) Date of Patent: Mar. 7, 2006

(54) IMAGE FORMING APPARATUS, DRUM UNIT, IMAGE FORMING MODULE, AND METHOD OF INSERTION AND REMOVAL OF A DAMPER INTO AND FROM AN IMAGE CARRIER DRUM

(75) Inventors: Takatsugu Fujishiro, Tokyo (JP); Takeo Suda, Tokyo (JP); Hideki Zemba, Tokyo (JP); Hisao Murayama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 17 days.

(21) Appl. No.: 10/456,583

(22) Filed: Jun. 9, 2003

(65) Prior Publication Data

US 2004/0042822 A1    Mar. 4, 2004

(30) Foreign Application Priority Data

| Jun. 10, 2002 | (JP) | ............................. 2002-169218 |
| Jun. 11, 2002 | (JP) | ............................. 2002-170655 |
| Jun. 21, 2002 | (JP) | ............................. 2002-181552 |
| Jul. 3, 2002 | (JP) | ............................. 2002-195224 |
| Apr. 18, 2003 | (JP) | ............................. 2003-113709 |

(51) Int. Cl.
*G03G 15/00* (2006.01)

(52) U.S. Cl. ...................... 399/159; 399/109; 399/116; 464/180

(58) Field of Classification Search ................ 399/159, 399/116, 117, 109, 107, 110; 29/895, 895.1, 29/402.03; 464/179, 180, 182; 492/18, 492/47

See application file for complete search history.

(56) References Cited

U.S. PATENT DOCUMENTS

| 5,357,231 | A | * | 10/1994 | Miwa et al. ............ 399/159 X |
| 6,010,407 | A | * | 1/2000 | Ishikawa ................ 464/180 X |
| 6,055,394 | A | | 4/2000 | Suda et al. .................. 399/107 |
| 6,070,030 | A | | 5/2000 | Fujishiro .................... 399/111 |
| 6,085,062 | A | | 7/2000 | Mizuishi et al. ............ 399/358 |
| 6,101,351 | A | | 8/2000 | Suda et al. .................. 399/114 |
| 6,131,003 | A | * | 10/2000 | Cais et al. ............. 399/159 X |
| 6,144,811 | A | | 11/2000 | Ohori et al. .................... 399/9 |
| 6,144,822 | A | | 11/2000 | Yamaguchi et al. ........ 399/121 |
| 6,148,161 | A | | 11/2000 | Usui et al. ..................... 399/58 |
| 6,256,465 | B1 | | 7/2001 | Yoshinaga et al. .......... 399/103 |
| 6,266,501 | B1 | | 7/2001 | Mizuishi et al. ............ 399/106 |
| 6,295,438 | B1 | | 9/2001 | Fujishiro et al. ............ 399/346 |
| 6,336,013 | B1 | | 1/2002 | Suda et al. .................. 399/103 |
| 6,463,237 | B1 | | 10/2002 | Suda et al. .................. 399/176 |
| 6,470,161 | B1 | | 10/2002 | Fujishiro et al. ............ 399/159 |
| 6,507,720 | B1 | | 1/2003 | Kabumoto et al. ......... 399/258 |
| 6,546,219 | B1 | | 4/2003 | Sato et al. ................... 399/176 |
| 6,560,414 | B1 | | 5/2003 | Suda et al. ..................... 399/12 |
| 6,567,643 | B1 | | 5/2003 | Yasui et al. ................. 399/391 |

(Continued)

FOREIGN PATENT DOCUMENTS

EP    0 896 258 A  *  2/1999

(Continued)

*Primary Examiner*—Sophia S. Chen
(74) *Attorney, Agent, or Firm*—Oblon, Spivak, McClelland, Maier & Neustadt, P.C.

(57) ABSTRACT

An image forming apparatus includes a photoreceptor belt formed by either a belt or a thin-walled cylinder. A charging unit that sets bias characteristics of the photoreceptor belt has an arrangement to approach towards the photoreceptor belt. A damper is provided on a side of the photoreceptor belt opposite to the side facing the charging unit. The damper absorbs vibrations in the photoreceptor belt through a supporting plate.

14 Claims, 17 Drawing Sheets

U.S. PATENT DOCUMENTS

| | | | |
|---|---|---|---|
| 6,591,077 B1 | 7/2003 | Yanagisawa et al. | 399/258 |
| 6,608,981 B1 | 8/2003 | Mae | 399/116 |
| 6,782,224 B1 * | 8/2004 | Kim | 399/159 |
| 2001/0012458 A1 * | 8/2001 | Fritz et al. | 399/159 X |
| 2001/0020761 A1 * | 9/2001 | Hasegawa | 267/141 |
| 2002/0186985 A1 * | 12/2002 | Fujishiro | 399/159 X |

FOREIGN PATENT DOCUMENTS

| | | |
|---|---|---|
| EP | 1 260 875 A1 * | 11/2002 |
| JP | 5-35167 | 2/1993 |
| JP | 05-188840 A * | 7/1993 |
| JP | 06-264970 A * | 9/1994 |
| JP | 7-72641 | 3/1995 |
| JP | 08-146824 A * | 6/1996 |
| JP | 10-97158 | 4/1998 |
| JP | 11-184308 | 7/1999 |
| JP | 2000-321929 | 11/2000 |
| JP | 2001-209236 A * | 8/2001 |
| JP | 2003-066770 A * | 3/2003 |

* cited by examiner

IMAGE FORMING APPARATUS, DRUM UNIT, IMAGE FORMING MODULE, AND METHOD OF INSERTION AND REMOVAL OF A DAMPER INTO AND FROM AN IMAGE CARRIER DRUM

BACKGROUND OF THE INVENTION

1) Field of the Invention

The present invention relates to a technology for preventing noise caused by vibrational resonance produced in a latent image carrier due to a thin-walled structure of an image forming apparatus.

2) Description of the Related Art

In image forming apparatuses like a copying machine, a facsimile, a printer, and a printing machine, steps of charging, writing, developing, and transferring are carried out for a photoreceptor as a latent image carrier. In the step of transferring, a toner image that is transferred on a recording medium like a recording paper is fixed to give a copy or a printout.

A structure that employs a non-contact charging method with aerial discharge using a corona charger is used for charging of the photoreceptor. However, in the structure, discharge products like ozone and nitrogen oxide are generated during discharging which may result in deterioration of environment or deterioration of charging characteristics on the photoreceptor. Therefore, a contact charging method, which does not generate the problems and enables to apply low voltage, is proposed as a substitute for an aerial discharge. A structure that injects charge by applying voltage between the photoreceptor and any one of a brush, a roller, and a blade of a conductive material that is kept in contact with the photoreceptor is known as one of the contact charging methods.

In the contact charging method, it is possible to apply low voltage and there is no generation of discharge products. However, since any one of a brush, a roller, and a blade made of a conductive material is in direct contact with the photoreceptor, it is easy to carry out reverse transition of deposits of toner etc. that remain on the photoreceptor. The deposits that have undergone reverse transition hinder the injection of charge and may deteriorate the charging characteristics. Furthermore, when a charging member is left without being used in a charging process for hours, a portion of the charging member that is in contact with the photoreceptor, changes shape due to permanent deformation. As a result, when the charging process is carried out again, there is no uniform contact of the charging member with the surface of the photoreceptor, which may result in charging unevenness.

To solve this problem, a unit that forms a charging range between the photoreceptor and the charging member is proposed. The charging member is disposed so that a prescribed minute interval is maintained between the photoreceptor and the charging member. The unit is an intermediate structure of non-contact and contact charging methods. A charging method (proximity charging method) has been employed in recent years. In this method, a prescribed minute interval is provided between the photoreceptor and the charging member such as a brush, a roller, and a blade of a conductive material, and charging is carried out by applying either of only dc voltage and dc voltage superimposed by an ac voltage.

In a structure which employs the proximity charging method, in a case where the charging member is a roller, a film of prescribed thickness is wound on both ends of the charging roller in its axial direction for setting of a gap and size of the minute gap is prescribed by thickness of the film.

Maintaining the prescribed size of the minute gap is an important condition to have no variation in the charging characteristics. When it is assumed that the size of the minute gap is maintained, the uniform charging becomes possible by applying of dc voltage for which setting is comparatively easy. However, when the size of the gap varies considerably, there is a considerable variation in a charging electrical potential in proportion to the variation in the size of the gap. Therefore, conventionally, various ideas have been thought up to achieve uniform charging characteristics even in a case where the size of the gap is varied by superimposing ac voltage on dc voltage.

On the other hand, apart from the charging unit, a developing unit is there to set the charging characteristics, i.e. bias characteristics. In a case of the developing unit, a developing method that uses either of a one-component developer and a two-component developer, is known. In the developing unit which uses the two-component developer, a developer that includes a carrier made of a magnetic material (substance) for an insulating toner, is agitated by an agitator. The toner is then deposited by charging on the carrier and the developer is made to be in contact with the photoreceptor.

In a developer carrier used in the developing unit, a developing sleeve, which can carry the developer on its surface, is used and a magnetic roll with a plurality of south poles and north poles lined up alternately on it is provided inside the developing sleeve. In the developer carrier, the developer is drawn up by magnetic force of the magnetic roll and a magnetic brush is formed by making the developer erected in the form of a brush on the surface of the developer carrier.

When the magnetic brush carried on the surface of the magnetic sleeve comes in contact with the electrostatic latent image that is formed on the photoreceptor based on either of image information and a paper document image, a developing bias is applied between the photoreceptor and the magnetic sleeve as the developer carrier. Due to the developing bias, the toner in the magnetic brush undergoes electrostatic absorption by the electrostatic latent image thereby forming a toner image.

As a developing bias, a bias as follows is used. The bias superimposes the ac voltage on the dc voltage to improve the developing capability, carry out the developing to the electrostatic latent image identically with utmost clarity, and improve uniformity of dots. Moreover, the bias has a first peak value V1 for transferring the toner from the developer carrier to the photoreceptor and a second peak value V2 for transferring the toner from the photoreceptor to the developer carrier. A method using the bias as a developer bias, in which a vibrating electric field is created in a developing area between the developer carrier and the photoreceptor and charged toner is applied on the photoreceptor, is known.

For the ac voltage which is superimposed on dc voltage, a rectangular waveform as in FIG. 44, a sine waveform as in FIG. 45, a triangular waveform as in FIG. 46, or a duty bias as shown in FIG. 47 is used.

In a case of using the duty bias shown in FIG. 47, a ½ value of the waveform differs from an average value of time integral. In FIG. 47, such a bias as follows is used. That is, the bias includes a time required for application of the first peak value V1 and a time required for application of the second peak value V2. At the first peak value V1, an electric field is created such that the electric field is biased in a direction in which the toner is transferred from the developing sleeve to the photoreceptor. At the second peak value V2, an electric field is created such that the electric field is biased in a direction in which the toner is transferred from the photoreceptor to the developing sleeve.

In a case of using the duty bias, by optimizing a frequency of ac voltage, a duty ratio (=t1/(t1+t2)×100% in FIG. 47), and a peak-to-peak value i.e. a difference between a maximum value of ac voltage (V1) and a minimum value of ac voltage (V2), it is possible to deposit the toner efficiently on an image area of the photoreceptor or not to deposit the toner on non-image area of the photoreceptor. Moreover, the optimization also enables the adjustment for increasing the density of an image while improving the uniformity of toner dots identical to the latent image.

Among methods which use the other developer i.e. the one-component developer, a jumping developing is a known method. In the jumping developing, an electrostatic latent image on the photoreceptor is developed while the developing sleeve as the developer carrier of the developing unit and the photoreceptor are maintained in the non-contact state. In the jumping developing, a layer of the one-component developer is formed on the developing sleeve. More specifically, a magnetic roll having a plurality of south poles and north poles lined up alternately on it and facing the electrostatic latent image carrier, is fixed on the developing sleeve. Furthermore, a toner brush is formed in a developing area and the developer (toner) is splashed and applied on the photoreceptor by applying a developing bias obtained by superimposing an ac component on a dc component, to the developing sleeve. Fogged toner is then returned in the direction of the developing sleeve and the latent image is visualized as a toner image.

When the developer is a one-component developer, in the same manner as the two-component developer, the developing bias method is used. In the developing bias method, by varying the peak-to-peak value, frequency, and duty ratio, it is possible to deposit the toner efficiently on the image area of the photoreceptor or not to deposit the toner on the non-image area of the photoreceptor. Moreover, the image density is increased while improving the uniformity of toner dots.

Depending on a setting of the bias characteristics that is carried out in the charging unit and the developing unit, noise is caused by applying ac voltage during shifting of the photoreceptor. Following is a reason for the generation of noise. A lighter weight conductive material in cylindrical form is used for the photoreceptor. Concretely, an aluminum cylinder having thin walls is used for the photoreceptor with a structure that resonates easily. Besides, not only units used in charging and developing processes are disposed facing the photoreceptor, but units for carrying out writing, transferring, and cleaning processes are also disposed facing the photoreceptor. In particular, the unit that carries out the cleaning process is disposed close to the photoreceptor, other than the units for charging process and developing process. Therefore, the photoreceptor can resonate easily due to vibrating electric field created when ac voltage is applied. Furthermore, due to a cleaning blade of the cleaning unit that is in contact with the photoreceptor, the vibrations are generated in the thin-walled cylinder due to repetition of deformation and restoration of shape of the cleaning blade when the cleaning blade scrapes the photoreceptor, and resonance in the photoreceptor produces noise.

That is, the image forming apparatuses like a copying machine, a printer, a facsimile, or a multifunction machine including any functions of these have been known widely. The image carrier drum includes either of a photoreceptor drum on surface of which a toner image is formed by charging, exposing, and developing and an intermediate transfer drum on surface of which a toner image is transferred from the photoreceptor and formed. The image carrier drum vibrates due to an external force that imparts vibrations, thereby resulting in generation of noise from the image carrier drum. For example, image forming units like a charging unit and a cleaning unit are provided around the photoreceptor drum. The charging member vibrates due to effect of ac voltage applied to the charging unit. The charging member vibrates due to stick-slip which is caused by the cleaning blade that is in pressed contact with the surface of the image carrier drum. The stick-slip starts as the image carrier drum rotates. The vibrations are transmitted to the image carrier drum to make the image carrier drum vibrate, and to thereby generate noise. A user may feel unpleasant because of noise. Therefore, measures have been taken in conventional techniques by providing the damper inside the image carrier drum to minimize vibrations of the image carrier drum to reduce the noise.

On the other hand, an image forming apparatus explained below has been in practical use to enable conservation of energy. The image forming apparatus uses a toner having a low melting point, and is structured such that a transferred toner image can be fixed on the recording medium at comparatively low temperature. However, a case of using the toner having a low melting point tend to generate noise easily as compared to a case of using a toner having a high melting point. Therefore, it is found that the conventional damper is unable to reduce the noise sufficiently. It is not sure that the use of the toner having a low melting point increases the noise. However, additives like wax or the like contained in the toner tend to stick to the surface of the image carrier drum. Since the amount of the additive that is deposited becomes non-uniform depending on an image pattern, a component like the cleaning blade in contact with the surface of the image carrier drum does not move uniformly. It is considered that loud noise that is generated in the image carrier drum is due to vibrations caused by non-uniform movement of the cleaning blade.

A structure in which the photoreceptor is made solid i.e. a solid cylinder has been disclosed, for example, in Japanese Patent Application Laid Open Publication ("JPA") No. HEI 07-72641, as the conventional structures to reduce the noise. Furthermore, a structure in which at least two of an elastic body and a cylinder member are fitted inside the photoreceptor and resonance in peripheral wall of the thin-walled cylinder is reduced has been disclosed in JPA No. HEI 11-184308, for the same purpose.

Moreover, there is another structure made by using a cylinder unit in which the damper is inserted inside the cylinder to reduce vibrations of the cylinder and therefore the noise is minimized. This type of structure has been disclosed in JPA No. HEI 11-35167 and JPA No. HEI 10-97158.

In recent years, products which can be recycled are promoted with an object of protection of environment and saving of resources. Same thing is expected about the cylinder unit. To have better recycling of a product formed by a plurality of components, it is necessary that the product be structured in such a way that each component of the product can be dismantled easily after the product is used and the dismantled component can be reused or can be reprocessed. However, in the conventional cylinder unit, the damper inserted inside the cylinder is fixed to the cylinder and therefore it is difficult to remove the damper from the cylinder. Thus, the conventional cylinder unit is found difficult to be recycled.

However, in the structure for prevention of noise, increase in cost of the photoreceptor and complications in structures are matters of concern. When the photoreceptor is structured using a solid body, it not only raises the cost but also increases weight. Due to increase in the weight, there is an increase in driving force required for rotation, which results in increase in inertial force. The increase in weight of the photoreceptor affects its portability, which may result in damaging the surface of the photoreceptor or causing an injury to a person due to heavy weight on dropping of the photoreceptor during replacement job. If a plurality of damping structures are provided inside the photoreceptor, there is a rise in cost due to the increased number of components and assembling processes.

Moreover, the image forming apparatus that uses the toner having a low melting point tends to generate noise easily as compared to the case of using the toner having a high melting point. Therefore, the conventional damper is unable to reduce the noise sufficiently.

SUMMARY OF THE INVENTION

It is an object of the present invention to solve at least the problems in the conventional technology.

According to one aspect of this invention, an image forming apparatus includes a latent image carrier that includes an arrangement of any of a belt and a thin walled hollow cylinder, the latent image carrier having a first surface and a second surface. The apparatus also includes a bias applying unit that has an arrangement for approaching towards the first surface of the latent image carrier, in which the bias applying unit sets bias characteristics of the latent image carrier. The apparatus further includes a vibration absorber that absorbs vibrations in the latent image carrier, in which the vibration absorber is made to touch the second surface of the latent image carrier.

According to another aspect of this invention, an image forming apparatus includes a toner image forming unit that forms a toner image on an image carrier drum using a toner having an outflow start temperature less than or equal to 102° C. measured by flow tester method. The apparatus also includes a damper provided inside the image carrier drum, in which the damper is made of a material with a tangent of loss tan δ of the damper is greater than or equal to 0.5. The tangent of loss is a value of damping effect.

According to still another aspect of this invention, a drum unit includes a cylinder, a shaft that extends inside and supports the cylinder, and a damper disposed inside the cylinder. The cylinder, the shaft, and the damper are assembled such that when the shaft is pulled out from the cylinder, the damper moves in the axial direction of the cylinder together with the shaft and is removed from the cylinder.

According to still another aspect of this invention, an image forming module includes an image carrier drum, and a shaft that extends inside and supports the drum. The module also includes a damper disposed inside the drum, in which the drum, the shaft, and the damper are assembled such that when the shaft is pulled out from the drum, the damper moves in the axial direction of the drum together with the shaft and is removed from the drum. The module further includes an image forming element that forms an image on the drum. The image carrier drum and the image forming element are assembled together as an integrated assembly.

According to still another aspect of this invention, the image forming apparatus includes an image carrier drum, a shaft that extends inside and supports the drum, and a damper disposed inside the drum. The drum, the shaft, and the damper are assembled such that when the shaft is pulled out from the drum, the damper moves in the axial direction of the drum together with the shaft and is removed from the drum.

According to still another aspect of this invention, a method of insertion and removal of a damper into and from an image carrier drum includes inserting the damper into the image carrier drum from an opening on one end in an axial direction of the image carrier drum and thereby mounting the damper inside the drum. The method also includes removing the damper from an opening on other end in the axial direction of the image carrier drum.

According to still another aspect of this invention, a drum unit includes an image carrier drum, and a damper. The damper is inserted into the image carrier drum from an opening on one end in an axial direction of the image carrier drum to thereby mount the damper inside the drum, and the damper mounted inside the drum is removed from an opening on other end in the axial direction of the image carrier drum.

According to still another aspect of this invention, an image forming module includes a drum unit having an image carrier drum and a damper, in which the damper is inserted into the image carrier drum from an opening on one end in an axial direction of the image carrier drum to thereby mount the damper inside the drum, and the damper mounted inside the drum is removed from an opening on other end in the axial direction of the image carrier drum. The module also includes an image forming unit that forms a toner image on the image carrier drum. The drum unit and the image forming unit are detachable from a main body of the image forming apparatus.

According to still another aspect of this invention, an image forming apparatus includes an image forming module. The image forming module includes a drum unit having an image carrier drum, and a damper, in which the damper is inserted into the image carrier drum from an opening on one end in an axial direction of the image carrier drum to thereby mount the damper inside the drum, and the damper mounted inside the drum is removed from an opening on other end in the axial direction of the image carrier drum. The apparatus also includes an image forming unit that forms a toner image on the image carrier drum. The drum unit and the image forming unit are detachable from a main body of the image forming apparatus.

According to still another aspect of this invention, an image forming apparatus includes a drum unit having an image carrier drum to form a toner image and a damper. The damper is inserted into the image carrier drum from an opening on one end in an axial direction of the image carrier drum to thereby mount the damper inside the drum, and the damper mounted inside the drum is removed from an opening on other end in the axial direction of the image carrier drum.

The other objects, features and advantages of the present invention are specifically set forth in or will become apparent from the following detailed descriptions of the invention when read in conjunction with the accompanying drawings.

DETAILED DESCRIPTION

Exemplary embodiments of an image forming apparatus, a drum unit, an image forming module, and a method for insertion and removal of a damper into and from an image carrier drum are explained in detail below with reference to the accompanying drawings. The present invention is not limited only to the following embodiments.

Figure 1:
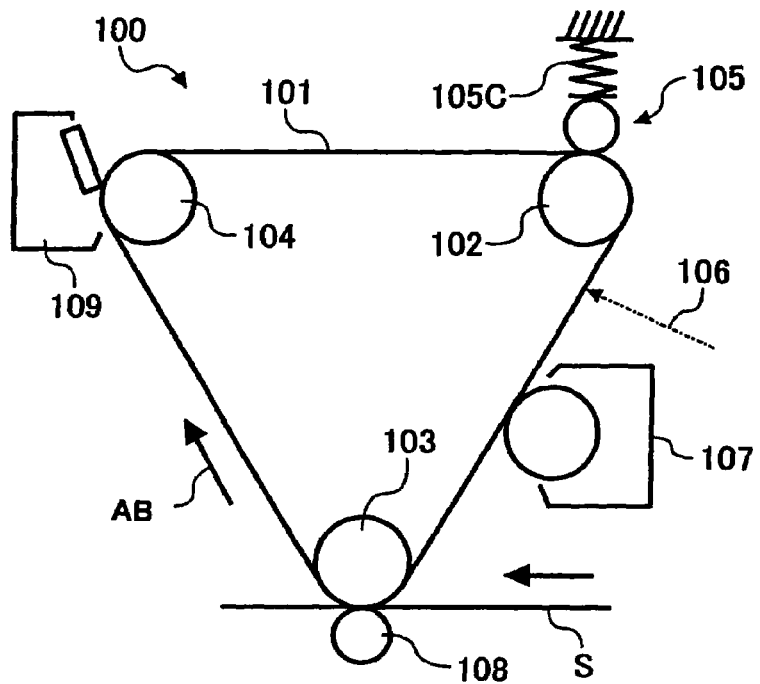
FIG. 1 is a schematic diagram of an image forming unit in an image forming apparatus according to a first embodiment of the present invention.

FIG. 1 is a schematic diagram of an image forming unit of an image forming apparatus 100 according to a first embodiment. In the image forming apparatus 100, a photoreceptor that functions as a latent image carrier, is formed by a belt (hereinafter, "photoreceptor belt 101"). The photoreceptor belt 101 is wound around among a plurality of rollers 102 to 104 and can move in a direction indicated by an arrow AB. A charging unit 105, a writing unit 106 (in FIG. 1, only optical path is shown), a developing unit 107, a transferring unit 108, and a cleaning unit 109 are disposed around the photoreceptor belt 101 along the direction of movement of the belt to carry out image forming processing.

The rollers 102 to 104 are arranged such that the photoreceptor belt 101 forms a triangle turned upside down as shown in FIG. 1 and a vertex of the triangle is a transferring position.

Figure 2:
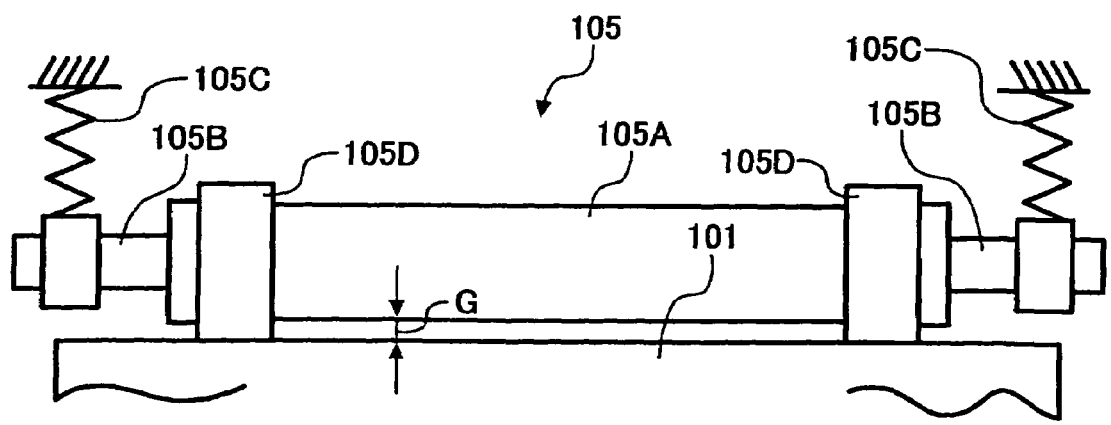
FIG. 2 illustrates a roller around which a photoreceptor belt used in the image forming unit shown in FIG. 1 is wound.

The charging unit 105 is one of the units which sets bias characteristics in the photoreceptor belt 101. As shown in FIG. 1 and FIG. 2, the charging unit 105 is a unit adopting a non-contact method and has a charging roller 105A provided close to the photoreceptor belt 101 maintaining a prescribed gap (G) that is set. Both ends of a shaft 105B of the charging roller 105A in its axial direction are biased by an elastic body 105C like a spring etc. towards the photoreceptor belt 101. A displacement caused by the biasing is regulated by an abutting member 105D that includes a film wound around both ends in the axial direction of the charging roller. The abutting member 105D protrudes from the peripheral surface of the charging roller 105A towards the photoreceptor belt 101.

In the embodiment, the prescribed gap (G) maintained by the abutting member 105D is set according to the type of a developer that is used in the developing unit 107. In the case of the one-component developer that uses only magnetic toner as developer, the gap is less than or equal to 300 $\mu$m and in the case of the two-component developer with toner and magnetic carrier that are mixed, the gap is less than or equal to 500 $\mu$m. The pushing by the elastic body 105C maintains the gap. The difference in the gap is irrespective of the developer that is used, and prevents deterioration of the developing capability when dc and ac voltages are applied.

Direct voltage is applied to the charging roller 105A via the prescribed gap G defined by the abutting member 105D due to constant voltage control of dc–700V through a control circuit (not shown). At the same time, alternate voltage is applied due to low current control and an aerial discharge is carried out to the photoreceptor belt 101. Thus, the photoreceptor belt 101 is charged uniformly.

When the photoreceptor belt 101 charged uniformly by the charging unit 105 moves, the writing unit 106 carries out optical writing. An electrostatic latent image according to either of image information and a paper document image, is formed due to the optical writing. The electrostatic latent image is processed to form a visualized image by a developer (toner), which is supplied by the developing unit 107. The visualized toner image is transferred on a recording paper S that is fed by a paper-feeding unit not shown. The image is transferred on the paper by the transferring unit 108 that includes a transfer roller provided against the roller 103 that is at the vertex of the lower part of the triangle formed by the photoreceptor belt 101. The transferred toner image is fixed on the recording paper S by a fixing unit (not shown), and discharged. The cleaning unit 109 removes residual toner and residual charge on the photoreceptor belt 101, after transferring of the image. The photoreceptor belt 101 moves again toward the charging unit 105, thereby preparing for the next image forming.

The structure of the charging unit 105 is not restricted only to a non-contact roller with respect to the photoreceptor belt 101. A structure that has a roller in contact with the photoreceptor belt 101, a structure that uses a conductive brush as a charging member, and even a magnetic brush that uses magnetic particles, can be used.

Figure 3:
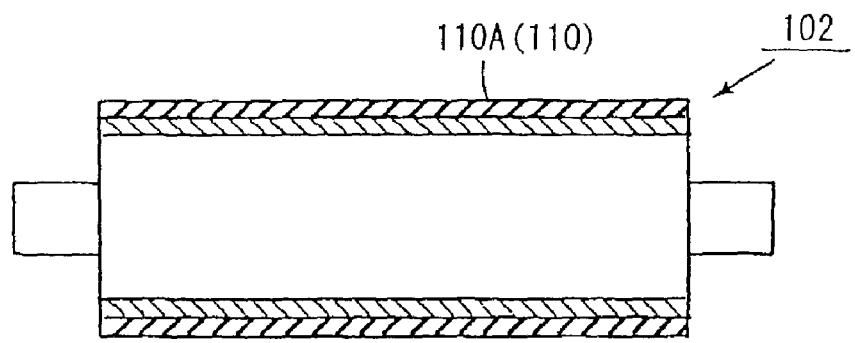
FIG. 3 illustrates another structure of the roller shown in FIG. 2.

FIG. 3 illustrates a supporting structure of the photoreceptor belt 101. The photoreceptor belt 101 is wound around among the rollers 102 to 104. The roller 102 facing the charging unit is provided with a vibration absorber 110 on the surface of the roller 102. The vibration absorber 110 uses a strong vibration absorbing material 110A that contains an elastic material like butyl rubber or nitrile rubber.

Figure 4:
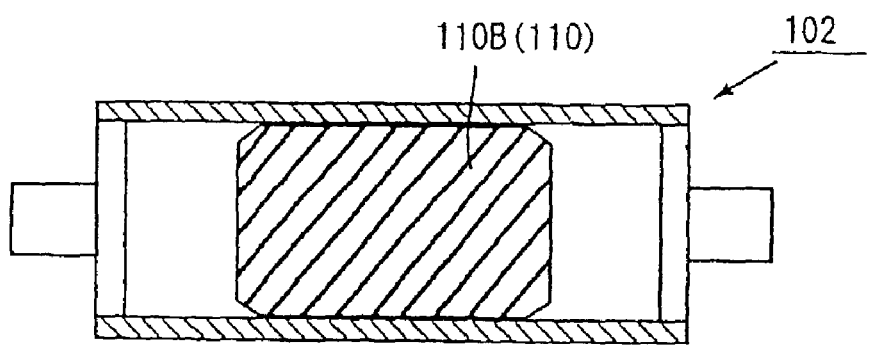
FIG. 4 illustrates still another structure of the roller shown in FIG. 2.
Figure 5:
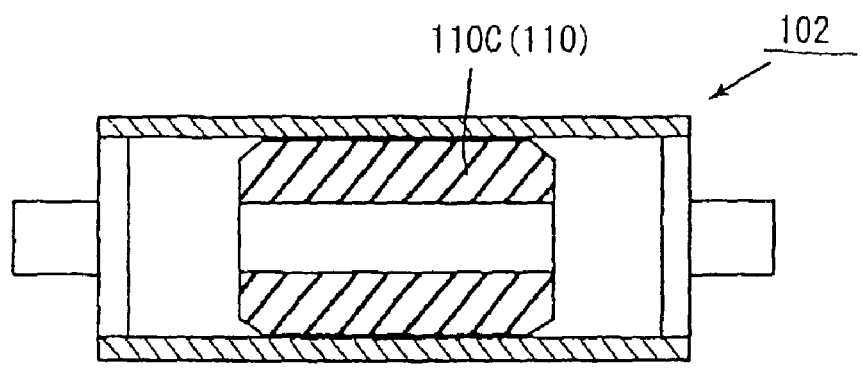
FIG. 5 illustrates still another structure of the roller shown in FIG. 2.

The structure of the vibration absorber 110 can be varied by substituting the vibration absorber provided on the roller 102 by either of structures as follows. One of the structures has a strong vibration absorbing material 110B in form of a solid block which is press fitted in the hollow cylindrical roller 102 as shown in FIG. 4. The other structure has a strong vibration absorbing material 110C in form of a block with a hollow inside of the block as shown in FIG. 5. In any structure of the vibration absorber 110, the elastic body made by either of butyl rubber and nitrile rubber is used. The vibration absorber 110 is provided in either of an axial direction of the roller 102 where the absorber tends easily to deform by bending and an area around this axial direction.

Tangent of loss tan δ for any of the strong vibration absorbing material 110A or the strong vibration absorbing blocks 110B and 110C, is set to be greater than or equal to 0.5. The tangent of loss tan δ means a tangent of a phase angle δ (loss angle) of stress and strain in the material used as the strong vibration absorbing material 110A or the strong vibration absorbing material blocks 110B and 110C. Value tan δ denotes intrinsic damping effect value of the material, and the greater the value of tan δ, the greater the damping effect is. Therefore, in the embodiment, generation of harsh noise is minimized by at least making the value of tangent of loss tan δ greater than or equal to 0.5 irrespective of use of the strong vibration absorbing material 110A and the strong vibration absorbing blocks 110B and 110C. The results of experiment regarding the settings of loss value tan δ are mentioned in the latter part.

When dc voltage and in addition ac voltage are applied to the charging unit 105 as one of the units for setting the bias characteristics, the photoreceptor belt 101 that corresponds the thin-walled member, resonates due to the vibrating electric field in the charging unit 105.

Since the resonance produced in the photoreceptor belt 101 is reduced due to absorption of vibrations by the roller 102 that is in contact with the photoreceptor belt 101, the resonance in the photoreceptor belt 101 is suppressed, thereby preventing noise caused by the resonance. The photoreceptor belt 101 in particular, which is a thin-walled structure, tends to resonate easily. However, when the photoreceptor belt 101 resonates, the resonance is controlled by a vibration absorbing function of the vibration absorbing material 110A or the vibration absorbing materials 110B and 110C which function as vibration absorber 110 when resonance is produced, there is almost no generation of noise.

As a modification of the structure in the embodiment, a drive roller of the photoreceptor belt 101 may be used as a roller provided with the vibration absorber 110. In this case, to transmit the driving force from the drive roller to the photoreceptor belt 101, the vibration absorber 110 is provided on the drive roller that is in stronger contact with the photoreceptor belt as compared to the contact of the other roller with the photoreceptor. By providing the vibration absorber 110 in the drive roller, the resonance produced in the photoreceptor belt 101 can be dealt with in the most effective manner and can be reduced efficiently.

Figure 6:
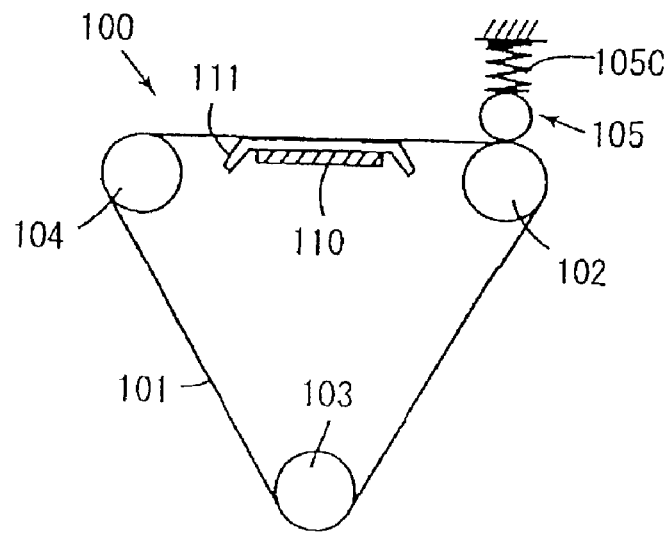
FIG. 6 illustrates a structure for prevention of noise in the image forming apparatus shown in FIG. 1.

Following is an explanation of another example in which a vibration absorption function is provided for the photoreceptor belt 101. FIG. 6 illustrates a structure in which the vibration absorber 110 is provided on a supporting plate 111 that is provided on an inner side of the photoreceptor belt 101. The supporting plate 111 functions as a guide for the photoreceptor belt 101. The supporting plate 111 is a flat plate made of hard material and the vibration absorber 110 is provided on the side of the supporting plate 111 opposite to the side thereof that faces the photoreceptor belt 101.

Figure 7:
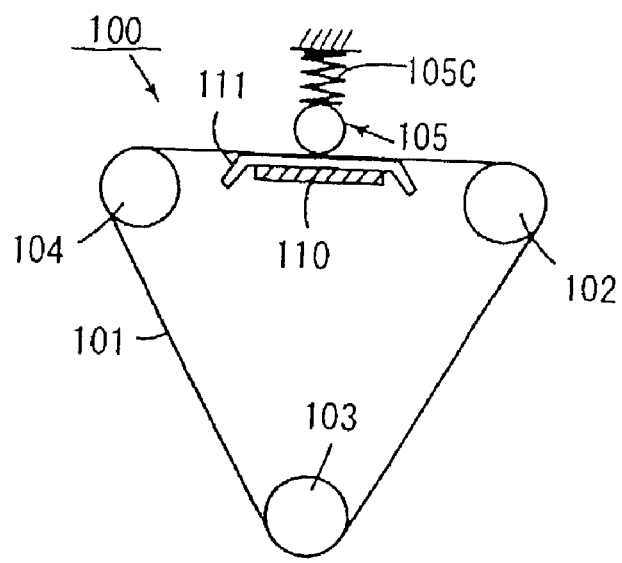
FIG. 7 illustrates another example of the structure for prevention of noise shown in FIG. 6.

FIG. 7 illustrates a structure in which the charging unit 105 as one of the units for setting the bias characteristics in FIG. 6 is disposed in a position opposite to the supporting plate 111 sandwiching the photoreceptor belt 101. In this case also, the vibration absorber 110 is provided on the side of the supporting plate 111 opposite to the side thereof that faces the photoreceptor belt 101.

According to the first embodiment, vibrations generated in the charging unit 105 when the bias is superimposed with the ac and dc voltages respectively by the charging unit 105 are propagated to the photoreceptor belt 101. When the vibrations are propagated, the photoreceptor belt 101 starts resonating. By propagating the resonance to the supporting plate 111 that is in contact with the photoreceptor belt 101, the vibration absorber 110 absorbs the resonance. Thus, the resonance in the photoreceptor belt 101 is minimized thereby preventing the generation of noise.

Figure 8:
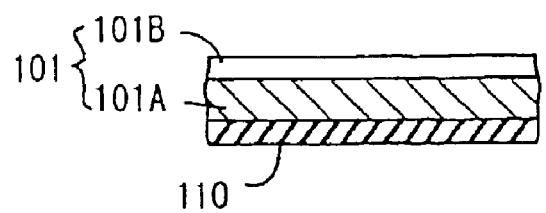
FIG. 8 illustrates a photoreceptor belt used in the image forming apparatus shown in FIG. 1.

Following is an explanation of a structure in which the photoreceptor belt 101 itself prevents. FIG. 8 is a cross section of the photoreceptor belt 101. The photoreceptor belt 101 is structured by superimposing a photosensitive layer 101B on a surface of a substrate 101A made of a thin metal foil or the like. On the opposite side of the photosensitive layer 101B beyond the substrate 101A is the vibration absorber 110 that is formed by an elastic body using either of a butyl rubber and nitrile rubber.

The vibration absorber 110 is provided on the side opposite to the photosensitive layer 110B via the substrate 101A, and therefore vibrations in the photoreceptor belt 101 are minimized due to absorption by the vibration absorber 110 thereby minimizing resonance in the photoreceptor belt and preventing the noise.

Why the vibrations are produced in the charging unit 105 has been explained above. The cleaning unit 109 provided with the cleaning blade is a unit that generates vibrations while being in contact with the photoreceptor belt 101. Vibrations caused by deformation due to scraping of the cleaning blade and by scraping during restoration of the shape after deformation, are also absorbed in the same manner as absorption of the resonance produced by the charging unit 105. The image forming apparatus in the invention includes a copying machine, a printer, a facsimile, and a printing machine.

Figure 9:
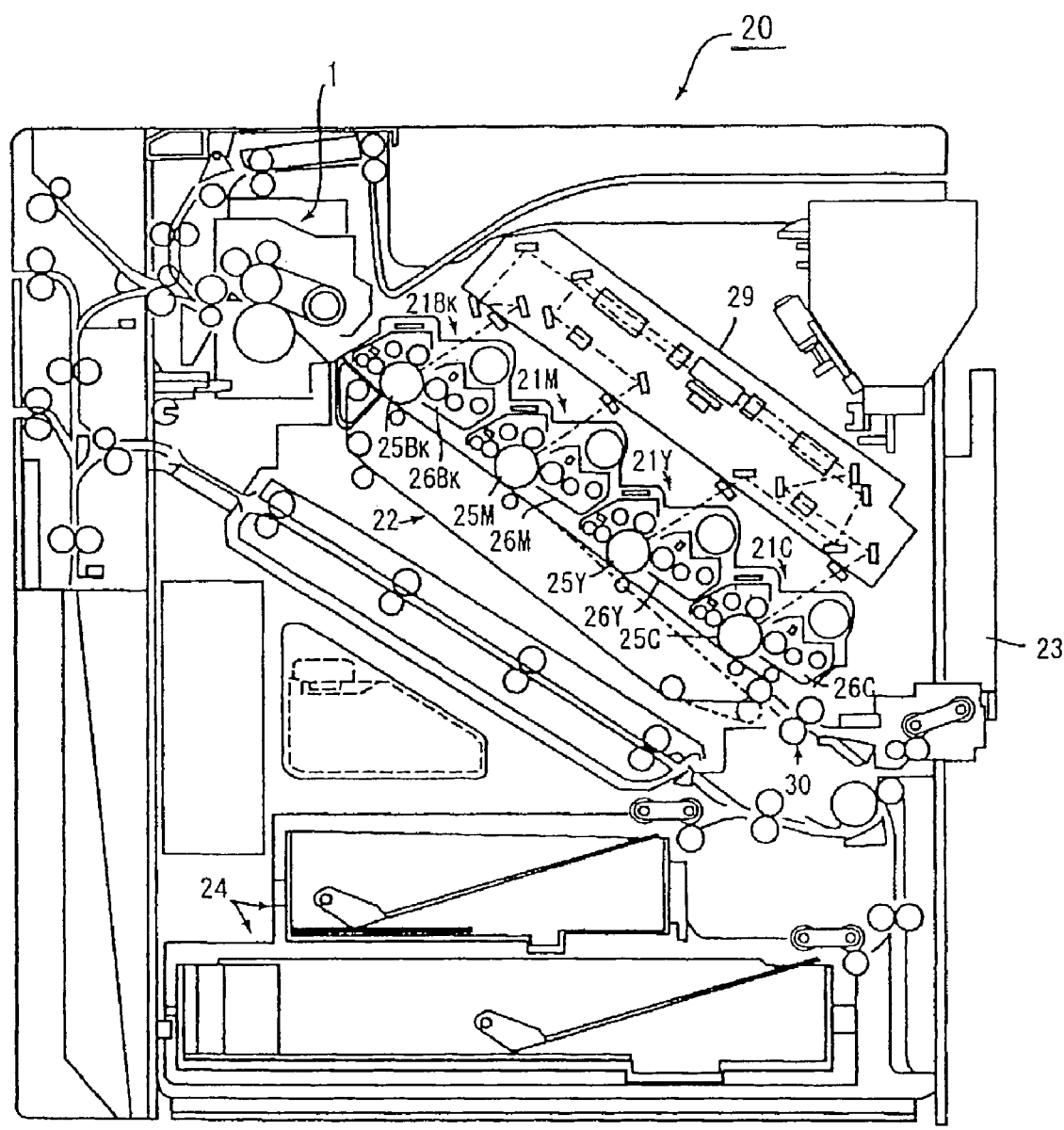
FIG. 9 illustrates another example of the image forming apparatus.

Following is an explanation of still another embodiment of the present invention. FIG. 9 is a schematic diagram of an image forming apparatus according to another embodiment. An image forming apparatus 20 in FIG. 9 is a copying machine in which a thin-walled cylinder is used as a latent image carrier and plurality of the latent image carriers are provided to allow image formation of plural colors. The image forming apparatus 20 in FIG. 9 employs a method of transferring an image of each color separation to the same intermediate transfer body one after another and performing collective transfer of the images superimposed on the intermediate transfer body to a sheet like recording medium such as paper.

The image forming apparatus 20 includes units as follows. The units include image forming units 21C, 21Y, 21M, and 21 BK that form images of each color according to an image on a document, which is transferred using a writing unit 29 that projects a writing light based on the image. The units also include a transferring unit 22 that is disposed opposite to the image forming units 21C, 21Y, 21M, and 21 BK. The units further include a manual feed tray 23 and a paper feeding cassette 24 as sheet-like medium feeding units for feeding a sheet-like recording medium to each transfer area where the image forming units 21C, 21Y, 21M, and 21BK and the transferring unit are disposed opposite to each other. The units further include register rollers 30 that feed a recording medium according to timing of image forming by the image forming units 21C, 21Y, 21M, and 21BK after transferring from the manual feed tray 23 and the paper feeding cassette 24. The units further include a fixing unit 1 that carries out fixing on the recording medium after the image is transferred in the transfer area.

In the image forming apparatus 20, any of sheet-like recording media can be used as a sheet-like medium. The sheet-like recording medium includes an ordinary paper used for copy in general (hereinafter "ordinary paper"), an OHP sheet, a 90K paper like a postcard and a card, a cardboard of basis weight greater than or equal to 100 g/m² and an envelope that are so-called special purpose sheets having a heat capacity more than that of the above types of sheets (hereinafter, simply referred to as "special purpose sheet").

The image forming units 21C, 21Y, 21M, and 21BK carry out developing of cyan, yellow, magenta, and black colors respectively. Although the toner color handled by each image forming unit is different, the structures of the units are the same. Therefore, the structure of the image forming unit 21C, as a representative of the image forming units 21Y, 21M, and 21BK, is explained below with reference to FIG. 10.

Figure 10:
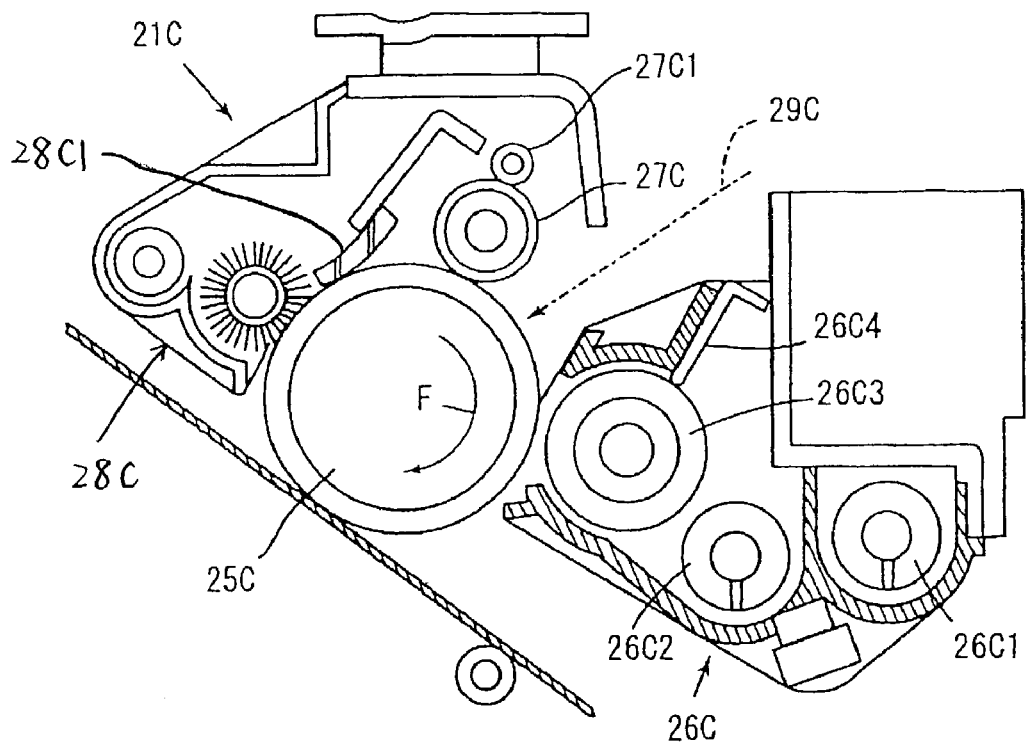
FIG. 10 illustrates a developing unit used in the image forming apparatus shown in FIG. 9.

The image forming unit 21C has a known structure, which is illustrated in FIG. 10. The unit 21C includes a photoreceptor drum 25C as an electrostatic latent image carrier, and also a charging unit 27C, a developing unit 26C, and a cleaning unit 28C that are disposed around the drum 25C in this order along the rotational direction F of the drum 25C. Components 25Y, 25M and 25BK correspond to photoreceptor drums in image forming units 21Y, 21M, and 21BK respectively. Further, writing light is received between the charging unit 27C and the developing unit 26C along line 29C. Similarly, image forming units 21Y, 21M, and 21BK contain developing units 26Y, 26M, and 26BK, respectively. The image forming apparatus 20 in FIG. 9 has the transferring unit 22 that is extended in a slanting direction, and therefore the transferring unit 22 occupies less space as compared to the space occupied by the transferring unit 22 provided in a horizontal direction.

The charging unit 27C includes, as shown in FIG. 10, of a roller having the structure similar to that in FIG. 2. Abutting members that protrude towards the photoreceptor drum 25C are provided on both ends of the roller in the axial direction to set a prescribed gap between the photoreceptor drum 25C and the roller of the charging unit 27C. The prescribed gap is explained later.

The developing unit 26C uses a biaxial agitation method carried out by agitating screws 26C1 and 26C2 which are two agitators that carry out mixing and agitating of toner supplied from a toner cartridge with magnetic carrier. Developer is frictionally charged due to agitation and magnetic carrier toner is adhered to the developer. The developer is carried on a surface of a developing sleeve 26C3 as a developer carrier, and is provided with a magnetic roller that has north and south poles lined up inside. The developer is supplied toward the photoreceptor 25C after a layer thickness is regulated by a doctor blade 26C4.

The developing sleeve 26C3 in the developing unit 26C is disposed to set a prescribed gap from the photoreceptor drum 25C. In the structure shown in FIG. 10, the prescribed gap is set to be less than or equal to 500 μm, preferably to 470 μm. This prescribed gap is set to allow the capability of toner adhesion to an electrostatic latent image on the photoreceptor drum to be enhanced, the developing capability of continuous black image to be improved, and uniform and identical development with utmost clarity of fine lines such as characters and dots etc to be realized. It is possible to maintain uniform and high developing capability of toner dots by giving identical reproducibility to the electrostatic latent image by setting the gap less than or equal to 500 μm. Making the prescribed gap greater than 500 μm does not guarantee good capability.

The abutting members (not shown) provided on both ends of the developing sleeve 26C3 in the axial direction are used for setting the gap between the developing sleeve 26C3 and the photoreceptor drum 25C. The abutting member is a member protruding toward the photoreceptor drum 25C that is similar to the abutting member 105D in the charging unit 105 shown in FIG. 2. In the embodiment, an abutting roller is used. The protruding roller is larger than the photoreceptor drum 25C and has an outer diameter equivalent to an amount of protruding more than the prescribed gap.

The structure in which the prescribed gap is set, enables to carry out splashing of toner to an image area on the latent image carrier and returning of toner from non-image area to the developer carrier due to the bias characteristics according to the type of developer used in efficient manner. This can optimize the electrical field effect by the bias and reliably prevent deterioration of developing capability and production of resonance in the latent image carrier.

The developing sleeve 26C3 maintains the gap of 470 mm from the photoreceptor drum 25C and carries a developer that includes toner and carrier made of the magnetic material. A negatively charged developing bias supplied from a power supply (not shown) is applied to the developing sleeve 26C3. Negatively charged toner is splashed and applied on an area of exposure of the photoreceptor drum 25C based on an electric field created between the sleeve 26C3 and the drum 25C, thereby carrying out developing. Thus, a toner image is formed.

Figure 47:
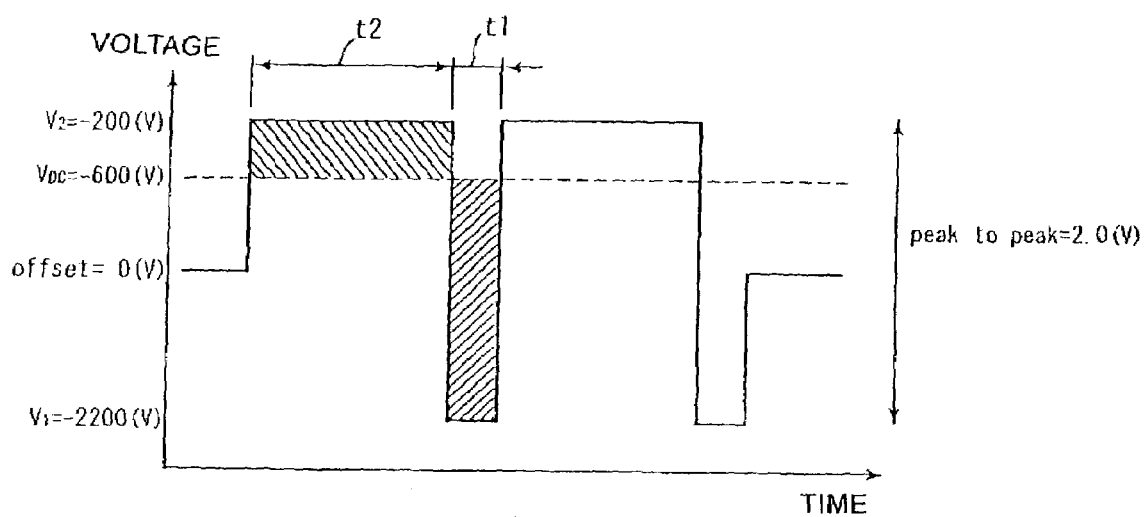
FIG. 47 is a graph of still another example of the developing bias.

The developing bias to be used includes a first electric potential area V1 and a second electric potential area V2 generated by superposing ac voltage on dc voltage as shown in FIG. 47. The first electric potential area V1 in which toner is moved from the developing sleeve 26C3 to the photoreceptor drum 25C, and the second electric potential area V2 in which toner is moved from the photoreceptor drum 25C to the developing sleeve 26C3. The negatively charged toner in the brush-like developer on the surface of the developing sleeve 26C3 is adhered, due to an electrostatic force, to an area of electrostatic latent image on the photoreceptor 25 by the developing bias.

At this time, an electrostatic force is produced so that a positively charged carrier is moved to an area of non-electrostatic latent image on the photoreceptor 25. However, due to restraining of carrier by a magnetic force of a magnetic roll in a developing roller 26C3, the positively charged carrier is not moved on to the photoreceptor drum 25C. Using of such a type of developing bias improves capability of toner deposition on the electrostatic latent image on the photoreceptor drum 25C, improves developing capability of continuous black image, and enables uniform developing with utmost clarity of fine lines such as characters and dots etc. identical to the electrostatic latent image.

In FIG. 10, a process cartridge is structured by supporting at least one from among the charging unit 27C which sets the bias characteristics to the photoreceptor drum 25C, the developing unit 26C, and the cleaning unit 28C having a cleaning blade 28C1 that is in contact with the photoreceptor drum 25C, by the same support as that of the photoreceptor drum 25C. The process cartridge is detachable from the main body of the image forming apparatus. Moreover, image forming units for four colors can be collectively drawn out to an outer side.

The cleaning unit is provided not only for the photoreceptor drum 25C. In addition, a cleaning unit 27C1 is provided for cleaning a roller used in the charging unit 27C. The cleaning unit 27C1 eliminates foreign matters like dust and toner reversely transferred from the photoreceptor drum 25C to the charging unit 27C, thereby preventing variation in the electric field due to charging unevenness and carrying out stable and uniform charging.

On the other hand, the photoreceptor drum 25C is a cylinder of 0.75 millimeter thick metal with a photosensitive layer provided on the surface of the cylinder and a vibration absorber provided inside the cylinder.

Figure 11:
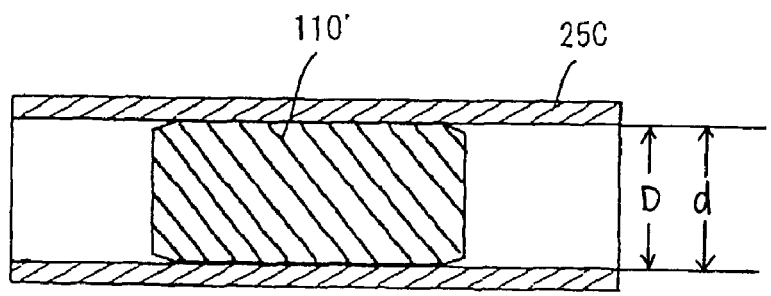
FIG. 11 illustrates a latent image carrier used in the image forming apparatus in FIG. 9.
Figure 12:
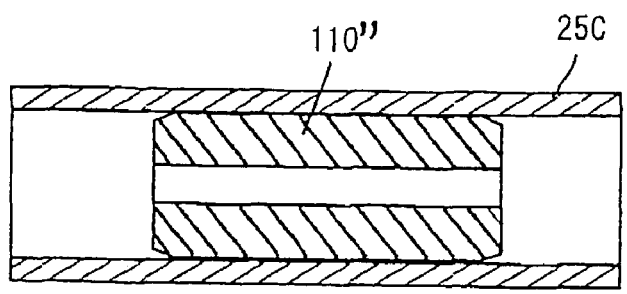
FIG. 12 illustrates another structure of the latent image carrier used in the image forming apparatus in FIG. 11.

FIG. 11 and FIG. 12 illustrate the internal structure of the photoreceptor drum 25C. The vibration absorber (shown by reference numeral 110' and 110" for convenience) that is formed by an elastic material containing either of butyl rubber and nitrile rubber is fitted inside the photoreceptor drum 25C. The vibration absorber shown 110' in FIG. 11 is in the form of a solid cylinder and the vibration absorber 110" shown in FIG. 12 is in the form of a hollow cylinder. It is noted that the vibration absorber 110' explained hereinafter includes the vibration absorber 110" when the two absorbers do not need to be individually explained. The vibration absorber 110' is provided in either of an area of the photoreceptor drum 25C in its axial direction where the photoreceptor drum 25C tends to easily deform by bending and a region around this area.

The tangent of loss tan δ of the vibration absorber 110' is set to be greater than or equal to 0.5 for the following reason. The tangent of loss tan δ means a tangent of phase angle δ (loss angle) of stress and strain in the material to be used in the vibration absorber, and the greater the value of tan δ, the greater the damping effect is.

Following is a result of experiment carried out for measurement of the tangent of loss tan δ, and the measurement was carried out according to a non-resonant vibration method that is prescribed in the Japanese Industrial Standards (JIS) K7244-4. A sample having a thickness of 2 millimeters, a width of 5 millimeters, and a length of 30 millimeters was used as a specimen and a result was achieved by carrying out measurement at applying frequency of 30 Hertz. The solid cylinder as shown in FIG. 11 and the hollow cylinder as shown in FIG. 12 which have different values of tangent of loss tan δ were prepared for samples for the experiment.

Figure 13:
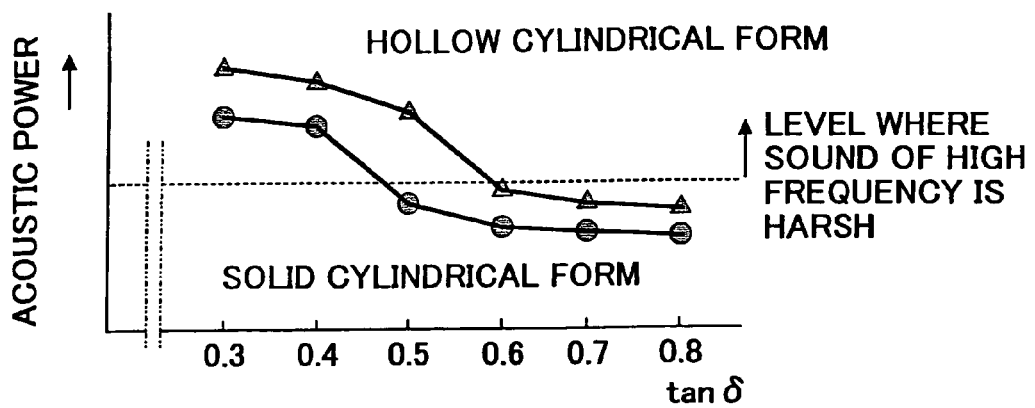
FIG. 13 is a graphical of noise characteristics in the structure of the latent image carriers shown in FIG. 11 and FIG. 12.

FIG. 13 is graphical representation of results of the experiment. Acoustic power is on a vertical axis and the tangent of loss tan δ is on a horizontal axis in this figure. It is evident from the result of the experiment that vibrations were reduced to a satisfactory level of hearing (high frequency sound is not harsh to ears) when the value of tan δ is 0.5 or more in the solid cylindrical vibration absorber 110' of FIG. 11. Similarly, vibrations were reduced to a satisfactory level of hearing when the value of tan δ is 0.6 or more in the hollow cylindrical vibration absorber 110" of FIG. 12. Moreover, even stronger vibration reduction effect can be achieved when the value of tan δ is 0.8 or more. Apart from noise due to the developing unit, noise due to the charging unit and cleaning blades was also measured together during the experiment.

From these results, practically satisfactory damping effect can be achieved by setting the tangent of loss tan δ to 0.5 or more and even better damping effect can be achieved when the value of tangent of loss tan δ is set to 0.8 or more. Thus, resonance (noise) produced in the developing unit 26, the charging unit 27, and the cleaning blade can be reduced. The structure of the vibration absorber 110' in the photoreceptor drum 25C is not limited to the photoreceptor drum 25C that forms an image of cyan color only, but the same structure can be used in the other photoreceptor drums as well.

The tangent of loss tan δ of the solid cylindrical vibration absorber 110' of FIG. 11 is smaller than the tangent of loss tan δ of the hollow cylindrical vibration absorber 110" of FIG. 12 because of the difference in masses of the two vibration absorbers 110' and 110". The harsh noise can be reduced effectively by changing the resonating frequency of the photoreceptor drum to the low frequency. The hollow cylinder is a favorable from the material cost point of view since this cylinder uses less amount of material than the solid cylinder.

The vibration absorber 110' is integrated into the photoreceptor drum 25C by either of press fitting and bonding. Assume that an inner diameter of the photoreceptor drum is D and an outer diameter of the vibration absorber 110' is d. If the vibration absorber 110' is press fitted and d is less than D, then damping effect and noise reduction effect cannot be achieved because the vibration absorber is not fitted tightly to the inner surface of the photoreceptor. Conversely, if d is excessively greater than D, excessive force is required for fixing the damper inside the photoreceptor. This creates difficulties in assembling and may result in deformation of the photoreceptor while assembling. Therefore, it is preferable that a relation between D and d is in a range of $D \leq d \leq (D+1)$ mm.

Following is an explanation of the photoreceptor drum in which the vibration absorber 110' is inserted. As a photoreceptor used in image processing based on the electrophotographic method, one that uses an inorganic semiconductor material like selenium or amorphous silicon, etc., one that uses an organic semiconductor material, and one as a combination of the two are known. In recent years, the organic photoconductors (photoreceptors) (OPC) have been used widely due to their low cost, a high degree of flexibility in designing, and non-polluting nature.

As the organic photoreceptor used in electrophotography, those as follows are known photoreceptors. That is, the organic photoreceptor includes a photoreceptor of photoconductive resins represented by polyvinyl carbazole (PVK), a charge transfer complex type photoreceptor represented by PVK-TNF (2,4,7-trinitrofluorenone), a pigment dispersing type photoreceptor represented by phthalocyanine binder, and a function separated type photoreceptor used as a combination of charge generating material and charge carrying material. Especially, the function separated type photoreceptors have been focused on. The mechanism in the electrostatic latent image forming in the function separated type photoreceptors is as follows. When light is irradiated after the photoreceptor is charged, the light passes through a transparent charge carrying layer, and is absorbed by the charge generating material in the charge generating layer. The charge generating material that has absorbed the light generates charge carriers and these charge carriers are injected into the charge carrying layer. The charge carriers move inside the charge carrying layer according to an electric field generated by charging and an electrostatic latent image is formed due to neutralization of charge on the surface of the photoreceptor.

In the function separated type photoreceptors, it is known and useful to use a combination of the charge carrying material that absorbs light mainly in an ultraviolet region with the charge generating material that absorbs light mainly in a visible region.

However, the organic-based electrophotographic photoreceptors have poor mechanical and chemical durability, which is a known shortcoming. Most of the charge carrying materials is developed as low molecular compounds. However, the low molecular compounds do not have a capacity to form a membrane independently. Therefore, the compounds are dispersed into or mixed with inactive high molecules to be used. Generally, the charge carrying layer, including the low molecular charge carrying material and inactive high molecules, is soft and has poor mechanical durability. In the electrophotography process, mechanical load exerted by various parts coming in contact (developing unit, charging unit, transfer paper, cleaning brush, cleaning blade etc.) tends to break the membrane easily.

Therefore, a protective layer that contains filler to protect a photosensitive layer and to improve the durability of the photosensitive layer is also provided on the photosensitive layer as a top layer. A material used for the protective layer includes resins such as ABS resin, ACS resin, olefin vinyl monomer copolymer, chlorinated polyether resin, allyl resin, phenolic resin, polyacetal resin, polyamide resin, polyamide imide resin, polyacrylate resin, polyallyl sulfone resin, polybutylene resin, polybutylene terephthalate resin, polycarbonate resin, polyether sulfone resin, polyethine resin, polyethelene terephthalate resin, polyimide resin, acrylic resin, polymethale pentane resin, polypropylene resin, polyphenylene oxide resin, polysulfone resin, AS resin, AB resin, BS resin, polyurethane resin, polyvinyl chloride resin, polyvinyledene chloride resin, and epoxy resin. A filler to be added to further improve the wear resistance of the protective layer includes fluororesin like polytetra fluoroethylene, and silicon resin, and these resins dispersed with inorganic materials like titanium oxide, tin oxide, potassium titanate, silica, alumina, etc.

Quantity of the filler to be added to the protective layer by weight is normally in a range of 10% to 40%, preferably in a range of 20% to 30%. When the quantity of the filler is less than 10%, the wear is increased, which deteriorates the durability. When the quantity of the filler is more than 40%, rise in electric potential in a bright area during exposure is increased and photographic sensitivity drops to the extent that cannot be neglected, hence more than 40% is not desirable. Moreover, dispersion-assisting agent can be added to the protective layer to improve dispersion of the filler. A dispersion-assisting agent used in paints can be used for adding. Normally, the quantity of the dispersion-assisting agent with respect to the quantity of the filler contained is in a range of 0.5% to 4%, preferably in a range of 1% to 2%. Furthermore, adding of charge carrying material to the protective layer is also effective and an antioxidant can also be added if necessary. A method of forming the protective layer includes a normal coating method like a spraying method.

The thickness of the protective layer is in a range of 0.5 $\mu$m to 10 $\mu$m, preferably in a range of about 41 $\mu$m to 6 $\mu$m. An intermediate layer can be provided between the photosensitive layer and the protective layer of the photoreceptor used in the embodiment. Normally, a binder resin is used as a main component in the intermediate layer. The resins for the binder or the like include polyamide, alcohol-soluble nylon, water-soluble polyvinyl butyral, polyvinyl buteral, or polyvinyl alcohol. A method of forming the intermediate layer includes the normal coating method. The appropriate thickness of the intermediate layer is in a range of about 0.05 $\mu$m to 2 $\mu$m.

The inventors of the present invention carried out an experiment on the noise reduction effect when the vibration absorber was fitted inside the photoreceptor having the above structure, and the following result was obtained. Following is an explanation about the photoreceptor that is used in this experiment.

A photoreceptor for evaluation is similar to the one explained in the previous embodiment that employs a hollow cylinder having an outer diameter of 30 millimeters, an inner diameter of 28.5 millimeters, and a wall thickness of 0.75 millimeter.

(1) Making of Photoreceptor (No. 1) for Evaluation

Solutions of compositions given below were sequentially coated on an aluminum drum having an outer diameter $\phi$ 30 millimeters and dried. The solutions include a coating solution for undercoat layer, a coating solution for charge generating layer, and a coating solution for charge carrying layer. When the coated layers were dried, the undercoat layer of thickness 3.5 $\mu$m, the charge generating layer of thickness 0.2 $\mu$m, and the charge carrying layer of thickness 25 $\mu$m were formed. Thus, electrophotographic photoreceptor (photoreceptor No. 1) for evaluation was obtained.

Coating Solution for Undercoat Layer:

Alkyd resin: 6 weight parts (Bekkozol 1307-60-EL made by DAINIPPON INK & CHEMICALS INDUSTRIES)

Melamine resin: 4 weight parts (Super Bekkamine G-821-60 made by DAINIPPON INK & CHEMICALS INDUSTRIES)

Titanium oxide: 40 weight parts

Methyl ethyl ketone: 200 weight parts

Coating Solution for Charge Generating Layer:

Trisazo pigments with the formulation as shown in chemical formula 1: 2.5 weight parts

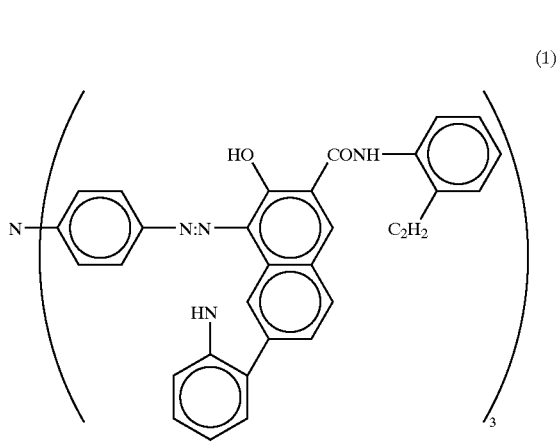

(1)

Polyvinyl butyral (UCC: XYHL): 0.25 weight parts cyclohexanone: 200 weight parts methyl ethyl ketone: 80 weight parts Coating Solution for Charge Carrying Layer:

Bisphenol A-type polycarbonate: 10 weight parts (Panlite K1300 made by TEIJIN)

Low molecular charge carrying material with the formulation as shown in chemical formula 2: 10 weight parts

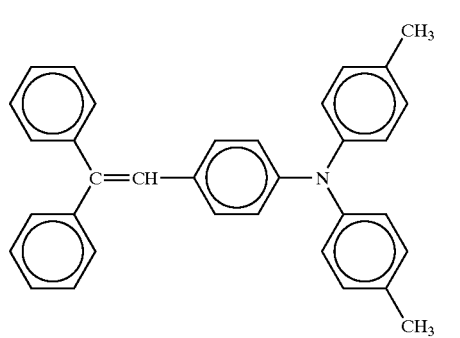

(2)

Methylene chloride: 100 weight parts (2) Making of Photoreceptor (No. 2) for Evaluation The photoreceptor (No. 2) for evaluation was made by forming a protective layer with a thickness of 2 μm on the charge carrying layer of the photoreceptor (No. 1) using a coating solution for protective layer with the formulation given below. The remaining layers of the photoreceptor (No. 2) were the same as in the photoreceptor (No. 1).

Coating Solution for Protective Layer:

Charge carrying material with the formulation as shown in chemical formula 3: 2 weight parts

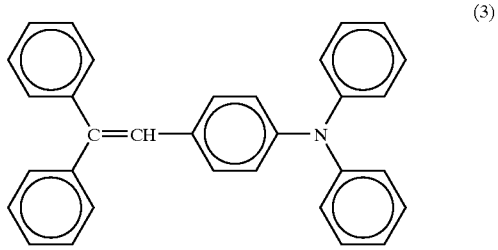

(3)

A-type polycarbonate: 4 weight parts

Methylene chloride: 100 weight parts (3) Making of Photoreceptor (No. 3) for Evaluation The photoreceptor (No. 3) for evaluation was made by forming a protective layer with a thickness of 2 μm on the charge carrying layer of the photoreceptor (No. 1) using a coating solution for protective layer with the formulation shown in chemical formula 3. The remaining layers of the photoreceptor (No. 3) were the same as in the photoreceptor (No. 1).

Coating Solution for Protective Layer:

Charge carrying material with the formulation as shown in chemical formula 3: 4 weight parts A-type polycarbonate: 4 weight parts Titanium oxide: 1 weight part Methylene chloride: 100 weight parts (4) Making of Photoreceptor (No. 4) for Evaluation.

The photoreceptor (No. 4) for evaluation was made by substituting titanium oxide for a filler which was dispersed in the protective layer of the photoreceptor (No. 3), by aluminum oxide. The remaining layers of the photoreceptor (No. 4) were the same as in the photoreceptor (No. 3).

The inventors of the present invention achieved following results by carrying out experiments using the photoreceptors for evaluation No. 1 to No. 4. The experiments were carried out on quality of images on each of the photoreceptors and on noise caused by the case where the vibration absorber was fitted in the photoreceptor.

In the experiments, a continuous paper-feeding test was carried out with a digital copying machine IMAGIO MF 200 (trade name) made by RICOH COMPANY, LTD. The image quality (overall evaluation of image density, resolution etc.) was found to be very good. A F-to-C ratio between molecules of fluorine and carbon on the surface of the photoreceptor as an index for deposition of fluorine-based material existing on the surface of the photoreceptor was found to be zero. Moreover, during running of the copying machine, the amount of decrease Äd from an initial value in the thickness of the photosensitive layer was found to be appropriate and hard copies having high definition could be obtained with stability during long period of time.

In the photoreceptors No. 1 to No. 4, the vibration absorber 110' was fitted as shown in FIG. 11 and FIG. 12 and developing bias in which ac voltage was superimposed on dc voltage was applied to the photoreceptors. As a result, resonance in the photoreceptors was reduced, transmission of vibrations of a cleaning blade was prevented, and prevention of noise generation was confirmed.

Following is an explanation of practical application of the present invention.

Figure 14:
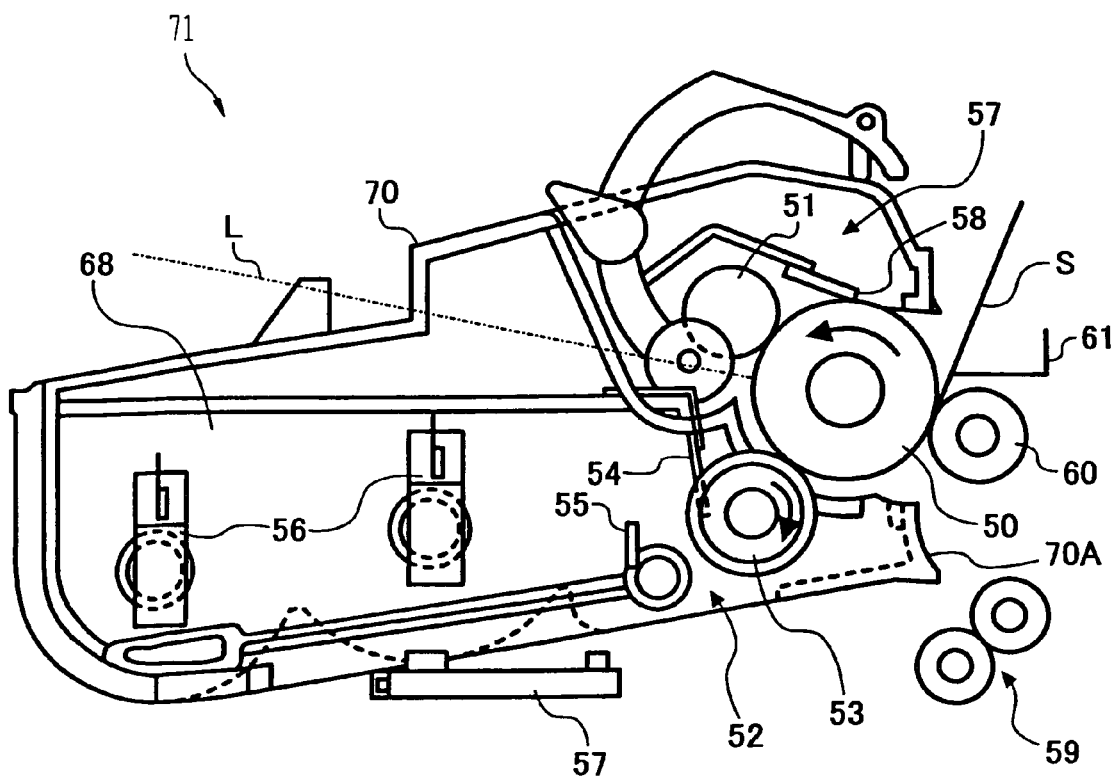
FIG. 14 illustrates an application related to the image forming apparatus.

FIG. 14 illustrates a laser printer as an example of the image forming apparatus that uses a one-component developer using magnetic toner as a developer. In a case of using the one component developer, structure of a basic image forming section resembles to that of an image forming apparatus that uses a two-component developer.

In FIG. 14, reference numeral 50 is an image carrier in the form of a drum (hereinafter "photoreceptor drum") provided inside the main body of the printer. Right side of the figure is a front side of the printer. When the printer is in use, the photoreceptor drum 50 rotates in a direction of an arrow shown in the figure (in counterclockwise direction). To start with, a charging roller 51 charges the surface of the photoreceptor drum 50 uniformly and then writing is carried out by irradiating laser light L from an optical writing unit thereby forming an electrostatic latent image on the surface of the photoreceptor drum 50.

A developing unit 52 provided adjacent to the photoreceptor drum 50 includes a developing roller 53. A prescribed gap between the photoreceptor drum 50 and the developing roller 53 is set to 300 μm or less, preferably 280 μm. The one-component developer stored in a developer storage 68 is carried on the surface of the developing roller 53 and is supplied to the photoreceptor drum. The prescribed gap is set to prevent deterioration of developing capability when dc voltage is applied and further ac voltage is applied in addition, similar to the case of using the two-component developer. When this gap is excessively large and the developing roller 53 is farther away from the photoreceptor drum 50, the improvement in the developing capacity when the ac voltage image is superimposed on the dc voltage, is affected. When the gap is set to be less than 300 μm i.e. to be made narrow, it is possible to further improve the high developing capacity such that a developed image is identical to a latent image having utmost clarity and toner dots are uniform. To maintain this prescribed gap, an abutting roller is used like in the case of the developing sleeve 26C3 as shown in FIG. 10.

To adhere magnetic toner as the one-component developer to the photoreceptor drum 50, a developing bias having dc voltage superimposed by ac voltage on it by a power source not shown is applied to the developing roller 53 in addition to an electrostatic absorption force of an electrostatic latent image formed on the surface of the photoreceptor drum 50 are applied combined on the developing roller 53. The magnetic toner is supplied to the photoreceptor drum 50 by the developing roller 53 in the developing unit 52 through rotation of the photoreceptor drum 50 to develop an electrostatic latent image on the photoreceptor drum 50.

The developing unit 52 includes known components such as a developing blade 54 that scrapes the developing roller 53 thereby carrying out frictional charging to toner, an agitating shaft 55 and an agitator 56 that agitate and carry the toner, and a toner ending sensor 57 that detects the quantity of the toner remaining in the developing unit.

In the structure shown in FIG. 14, a vibration absorber is included in the photoreceptor drum 50 similarly as shown in FIG. 10. For the structure, the structures shown in FIG. 11 and FIG. 12 are used.

In FIG. 14, a sheet-like recording material which is stored in a paper-feeding cassette (not shown) is fed along the rotation of the photoreceptor drum 50, and the recording material stops for a time when it is held between a pair of register rollers 59. When the pair of register rollers 59 rotates with the timing matched with that of an image on the photoreceptor drum 50, the recording material is guided by a part 70A on an outer surface of a cartridge case 70 and forwarded to a transfer nip between the photoreceptor drum 50 and the transfer roller 60. A toner image on the photoreceptor drum 50 is transferred to the recording material through a transfer bias from the transfer roller 60.

After transferring of the image to the recording material, the recording material is discharged by a discharging pin 61 and carried upward through a carrier path in a state of the material as indicated by a reference numeral S. The recording material is then guided to a fixing nip formed at a position where a pressure roller and a fixing roller of the fixing unit not shown are in contact with each other. Here, the transferred image is fixed by heat and pressure, and the recording material is discharged to a paper discharging section with an image surface facing downward.

Residual toner on the photoreceptor drum 50 after having transferred the image is eliminated by a cleaning blade 58 of the cleaning unit 57 through the rotation of the photoreceptor drum 50. The photoreceptor drum 50 is kept ready for recharging by the charging roller 51.

In the laser printer structured as shown in FIG. 14, the photoreceptor drum 50, the charging roller 51, the developing unit 52, and the cleaning unit 57 etc., are accommodated in the cartridge case 70 as a casing of the printer, thereby forming a process cartridge 71. The main body of the image forming apparatus is made compact in size by improving an accuracy of relative position of each component with respect to the other component. The handling is made easier by enabling the replacement of parts at a time instead of replacing them at different times. The maintenance of the image forming apparatus is made simple to make its life longer.

Thus, according to the first embodiment, the vibration absorber is disposed on the side opposite to the surface facing the unit in which the bias characteristics are set in the latent image carrier. Therefore, due to the bias characteristics, the vibration absorber that is in contact with the latent image carrier absorbs a part of the vibrations in the latent image carrier, which is caused by the vibrating electric field generated when ac voltage is applied. This enables to reduce the resonance of the latent image carrier, thereby preventing noise. Even if the latent image carrier is either of a belt and a thin-walled cylinder, noise can be prevented without increasing the mass and complicating the structure of the latent image carrier.

Further, since the vibration absorber is in the form of a roller and the strong vibration absorbing material is provided either on the surface of the absorber or inside the absorber, the propagation of vibrations is prevented when the roller is in contact with the latent image carrier. Thus, the noise due to resonance in the latent image carrier is prevented.

Moreover, since the drive roller is used as the vibration absorber when the latent image carrier is in the form of a belt, a material that comes in firm contact with the latent image carrier, can be used as a damper. This facilitates the absorption of vibrations generated in the latent image carrier and enables to reduce the resonance in the latent image carrier by using the existing structure.

When the latent image carrier is a belt, the vibration absorber is provided on the opposite side of the surface of the supporting plate where the supporting plate is in contact with the latent image carrier. The supporting plate is made of a rigid body in the form of a flat plate that is in contact with the belt. Therefore, the vibration absorber absorbs the vibrations generated in the belt without obstructing the movement, and resonance produced in the latent image carrier can be reduced.

Since the vibration absorber is disposed in a position opposite to the unit in which the bias characteristics with respect to the latent image carrier are set, the resonance can be reduced in the most effective manner at the origin of resonance produced in the latent image carrier due to the bias characteristics.

Since the latent image carrier is a substrate in the form of a thin belt made of a material that absorbs strong vibrations, the material can reduce the vibrations of the latent image carrier as compared to the case where a photosensitive layer is provided on the surface of the thin belt-like substrate. Therefore, there is no need to have a special arrangement for damping and hence no extra cost is needed.

By setting the value of tangent of loss tan δ which affects the damping effect to a value greater than or equal to 0.5, the frequency of resonance can be varied to the frequency range in which high frequency sound that is harsh to ears is not generated. Therefore, even when the noise is generated from the latent image carrier, the same effect as that of reducing the noise can be achieved.

Since the vibration absorber is in the solid cylindrical form, it is possible to vary the resonance frequency of the latent image carrier to the low frequency range efficiently by using the difference of mass compared to that of the hollow cylindrical form. Thus, the resonance caused by the vibrations of the latent image carrier can be prevented and noise can be reduced in an efficient manner.

It is possible to reduce the material cost by using the vibration absorber in the hollow cylindrical form. In a case of the structure that leads to the reduction in the material cost, in other words, even in a case where it is difficult to decrease the resonance frequency due to the mass different from that in a case of the solid cylindrical form, deterioration of the damping effect can be prevented reliably by setting the value of tangent of loss tan δ which affects the damping effect to a value greater than or equal to 0.6.

Moreover, since the vibration absorber is fitted inside the latent image carrier by either of press fitting and bonding, it is thoroughly integrated with the latent image carrier thereby reducing the resonance in the latent image carrier in an efficient manner.

A second embodiment of this invention will be explained below.

Figure 15:
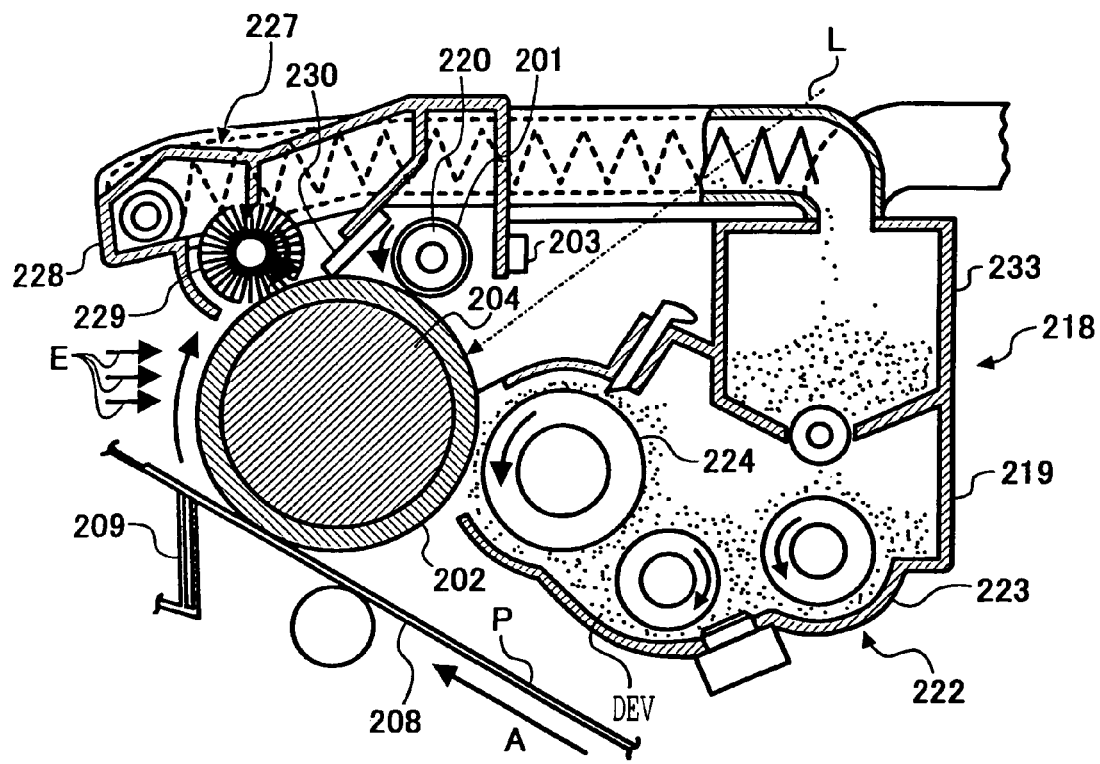
FIG. 15 is a schematic diagram of an image forming unit in an image forming apparatus according to a second embodiment of the present invention.

FIG. 15 is a cross section of a schematic structure of an image forming apparatus that uses an image carrier drum in the form of a hollow cylinder according to the second embodiment. An image carrier drum 202 in the figure is a photoreceptor drum with a photosensitive layer provided on an outer peripheral surface of a circular cylindrical tube made of a conductive metal like aluminum. In an example shown in FIG. 15, an image forming module 218 is structured by assembling the image carrier drum 202 integrally with an image forming unit that forms a toner image as explained later. The image carrier drum 202 is rotatably supported by a case 219 of the image forming module 218, and is driven by a drive motor (not shown) in the clockwise direction in FIG. 15. At this time, a charging roller 220 as an example of a charging unit rotatably supported by the case 219 is rotated, and a charging voltage is applied to the charging roller 220. Thereby, the surface of the image carrier drum 202 is charged to a prescribed polarity. In this image forming apparatus, a spacer including a tape 201 is wound around each end of the charging roller 220 in its longitudinal direction. The tape 201 is in contact with the outer peripheral surface of the image carrier drum 202 and the charging roller 220 is in a position such that there is a minute gap with respect to the surface of the image carrier drum 202.

A modulated laser beam L emitted from an exposing unit (not shown) is irradiated on the surface of the image carrier drum after charging, and an electrostatic latent image is formed on the image carrier drum. It is noted that the exposing unit is provided separately apart from the image forming module 218. This electrostatic latent image is visualized as a toner image by a developing unit 222. The toner image is carried on a transfer belt 208, which moves in direction A, and is transferred to a recording medium P like a transfer paper etc. by an action of a transfer brush 209. The transfer brush 209 is an example of a transferring unit. When the toner image having been transferred to the recording medium P passes through a fixing unit (not shown), the toner image is fixed on the recording medium P due to effect of heat and pressure. A residual toner on the image carrier drum that is left after the transferring of the toner image is eliminated by combined action of a cleaning brush 229 and a cleaning blade 230 of a cleaning unit 227.

The developing unit 222 includes a developing case 223 formed with a part of the case 219 of the image forming module 218, and a developing roller 224 rotatably supported by the developing case 223. The developing case 223 contains developer DEV. The rotating developing roller 224 carries the developer DEV and transfers it. The transferred developer visualizes the electrostatic latent image. In this case, the two-component developer including toner and carrier, is used. When a decrease in toner density of the developer is detected, the developing case 223 is replenished with the toner from a toner container 233. The cleaning unit 227 includes a cleaning case 228 also formed with a part of the case 219 of the image forming module 218. The cleaning brush 229 and the cleaning blade 230 are supported by the cleaning case 228. Thus, in the image forming apparatus shown in FIG. 15, the image carrier drum 202 and the image forming units, arranged around the drum, such as the charging roller 220, the developing roller 224, the cleaning brush 229, and the cleaning blade 230 are integrally assembled to the case 219 to form the image forming module 218. The image forming module 218 is detachable from the casing (not shown) of the image forming apparatus and can be replaced by a new image forming module when the module reaches end of its life.

Thus, in the image forming apparatus, the toner image is formed on the surface of the rotating image carrier drum 202, and the formed toner image is then transferred to the recording medium P to achieve a recorded image. The fixing unit fixes the toner image that has been transferred on the recording medium P. The toner having a low melting point is used in the developing unit to enable the fixing of the toner image in the fixing unit at a comparatively low surface temperature of a fixing roller, for example, 145° C. The image forming apparatus forms a toner image on the image carrier drum using toner having an outflow start temperature, measured by flow tester method, of less than or equal to 102° C., preferably in a range of 99° C. to 102° C. A Shimadzu Flow Tester CFT500 made by SHIMADZU SEI-SAKUSHO is used for measurement of the outflow start temperature by the flow tester method.

This flow tester is provided to melt a test sample in a cylinder by heating the cylinder from outside, apply pressure with a constant load by a piston from the topside of the cylinder, and extrude the test sample through pores in a die disposed at a bottom of the cylinder. A temperature at which the melted test sample starts extruding from the pores of the die is an outflow start temperature. By using toner having an outflow start temperature less than or equal to 102° C., the toner image is formed on the image carrier drum. Specifically, the toner is used under setting conditions as follows, load exerted on the piston: 10 kg/cm$^2$, temperature rising rate: 3.0° C./min, diameter of pore in the die: 0.5 millimeter, and die length: 10 millimeters. The flow tester method is described in Japanese Patent Application Laid Open Publications No. 2001-147551 and No. 2001-75106.

The charging roller 220 is disposed on the outer peripheral surface of the image carrier drum 202 in FIG. 15 and the cleaning blade 230 is in contact with the surface of the drum. When charging voltage having ac voltage superimposed on dc voltage is applied to the charging roller 220, the charging roller 220 vibrates due to the application of the ac voltage. Further, the cleaning blade 230 vibrates due to stick-slip during rotation of the image carrier drum 202. These vibrations transmitted to the image carrier drum 202 may cause the drum 202 to vibrate and lead to generation of noise. Especially, when the toner having a low melting point is used, a large amount of noise may be generated in the conventional image forming apparatus thereby causing the user to feel uncomfortable. As a tube of the image carrier drum 202, a thin-walled hollow cylinder made of aluminum is used. This tube has an outer diameter of about 30 millimeters, an inner diameter of about 28.5 millimeters, and a wall thickness of about 0.75 millimeter. The conventional image forming apparatus tends to generate noise easily when the image carrier drum 202 formed of such a thin tube is used.

Figure 16:
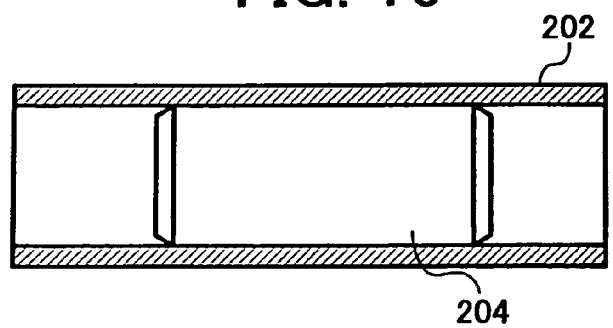
FIG. 16 is a longitudinal cross section of an image carrier drum with a damper disposed inside the drum.

Therefore, a damper 204 is provided inside the image carrier drum 202 in the image forming apparatus as shown in FIG. 15 and FIG. 16. The damper 204 shown in FIG. 17 can also be used. The damper 204 is formed of a material having a tangent of loss tan δ greater than or equal to 0.5. The tangent of loss tan δ is a tangent of a phase angle δ (loss angle) of stress and strain in the material. The greater the value of tangent of loss tan δ, the greater the damping effect is.

In the image forming apparatus, considering the characteristics of this type of damping material, the damper 204 made of the material having a tangent of loss tan δ greater than or equal to 0.5 is provided to effectively suppress vibrations of the rotating image carrier drum 202. Even by using the toner having a low melting point, it is possible to reduce the noise generated in the image carrier drum 202 during image formation to an extremely low level. A rubber material like butyl rubber, nitrile rubber etc. can be used as a material having the tangent of loss tan δ greater than or equal to 0.5.

Figure 17:
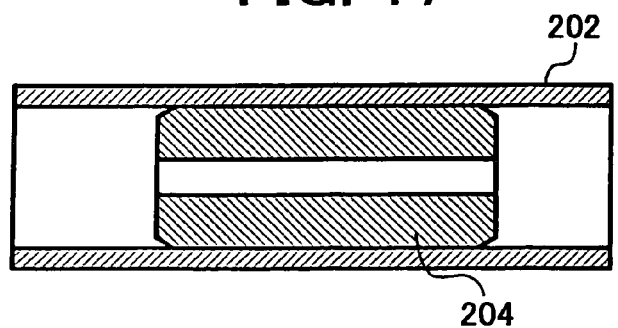
FIG. 17 is a longitudinal cross section of a damper which is different in shape than the damper in FIG. 16.

The inventors of the present invention provided the damper 204 made of rubber as shown in FIG. 17 having a value of the tangent of loss tan δ0.5 and the damper 204 made of ABS resin having a value of the tangent of loss tan δ less than 0.5 inside the image carrier drum 202 respectively as shown in FIG. 15, and carried out image forming to find out if the noise was audible to a person who was present in the vicinity of the image forming apparatus. The charging voltage in which an ac voltage was superimposed on dc voltage was applied on the charging roller 220. The inventors used two types of toner. One of the toners had an outflow start temperature of 102° C. or less and had a low melting point such that the toner image could be fixed at a surface temperature of the fixing roller of about 145° C. in the experimental apparatus. The other toner had the outflow start temperature of higher than 102° C. and a high melting point such that the toner image could be fixed at a surface temperature of the fixing roller of about 175° C. The tangent of loss tan δ of the damper 204 was measured according to a non-resonant vibration method prescribed in JIS K7244-4. A specimen having a thickness of 2 millimeters, a width of 5 millimeters, and a length of 30 millimeters was used, and measurement was carried out at applied frequency of 30 Hertz. The results of the experiment are shown in table 1.

TABLE 1

|  | Toner having a high melting point | Toner having a low melting point |
| --- | --- | --- |
| Damper made of ABS resin | No generation of noise | Generation of noise |
| Damper made of rubber having tan δ 0.5 | No generation of noise | No generation of noise |

In table 1, "generation of noise" means that the person observing the experiment being in the vicinity of the image forming apparatus could clearly hear the noise, and "no generation of noise" means that the noise was not heard. As can be seen in table 1, even with the toner having the low melting point, when the damper 204 made of a material that had the tangent of loss tan δ0.5 was inserted inside the image carrier drum 202, generation of noise was not noticed. With the same toner, when the damper 204 made of a material that had the tangent of loss tan δ less than 0.5, generation of noise was confirmed. When the same experiment was carried out without inserting the damper inside the image carrier drum, significant noise generation was recognized by using either of the toners.

When the damper 204 is formed of a material that has the tangent of loss tan δ greater than 0.5, particularly 0.6 or more, or even 0.8 or more, the damping effect to the image carrier drum 202 can be improved considerably.

When a toner including a metallic salt of high fatty acid like a zinc stearate is used as a toner for the image forming apparatus, a part of the toner gets deposited on the surface of the image carrier drum 202. Due to the toner deposited on the surface, the coefficient of friction of the toner with the cleaning blade decreases thereby improving slip of an edge of the cleaning blade 230. This reduces vibrations in the cleaning blade and further improves the effect of preventing noise generation.

The damper 204 in FIG. 16 is in a solid circular cylindrical form whereas the damper 204 in FIG. 17 is in a hollow circular cylindrical form. When the solid damper 204 as shown in FIG. 16 is used, the weight of the damper 204 is increased, and thereby the overall weight of the assembly of the damper 204 and the image carrier drum 202 increases. Thus, high frequency noise that is harsh to ears can be reduced effectively. On the other hand, when the hollow damper 204 as shown in FIG. 17 is used, the material used for the damper can be reduced and the cost can be also reduced. In such a case, the tangent of loss tan δ, the weight, the form, especially the thickness of the damper 204 has to be set appropriately to obtain required damping effect. It is possible to use the damper 204 molded in a hollow circular cylindrical form, and it is also possible to structure the damper 204 in the hollow circular cylindrical form by rolling up the sheet-like material. According to the latter method, the damper 204 in the hollow circular cylindrical form can be fabricated at a low cost using the sheet-like material thereby reducing the cost considerably.

As a method of fixing the damper 204 into the image carrier drum 202, methods as follows can be employed. One of the methods is realized by inserting, by press fitting, a damper into the image carrier drum 202. More specifically, the damper has a setting such that d is slightly larger than D where d is an outer diameter of the damper 204 before being inserted into the image carrier drum 202 and D is an inner diameter of the image carrier drum 202. Another method is realized by setting d to be slightly smaller than D, inserting such a damper 204 into the image carrier drum 202, and fixing the damper 204 to the inner wall surface of the image carrier drum 202 with an adhesive. Sufficient damping effect can be achieved by using either of the methods. However, in the case of press fitting the damper inside the image carrier drum, if d is smaller than D, then the damper 204 is not fitted tightly against the inner wall surface of the image carrier drum 202 thereby deteriorating the damping effect. Conversely, if d is excessively larger than D, excessive force is required for inserting the damper 204 into the image carrier drum 202. This not only creates difficulties in assembling but also results in deformation of the image carrier drum during assembling. Therefore, it is preferable to have a relation between values of D and d such that $D \leq d \leq (D+1)$ millimeter.

When the damper is fixed inside the image carrier drum by press fitting, there is no need to use an adhesive and the cost for this fixing can be reduced. Besides, the damper 204 can be removed from the image carrier drum 202 easily and can be recycled. Whereas, when the damper 204 is fixed inside the image carrier drum 202 by using the adhesive, it can be fixed very firmly.

The image forming apparatus in FIG. 15 has the cleaning blade 230 that is in press contact with the surface of the image carrier drum 202 to clean the surface thereof after transferring of the toner image. It is possible to eliminate foreign matters like paper dust etc. that are caught between the cleaning blade 230 and the surface of the image carrier drum 202 by rotating the image carrier drum in the reverse direction by only a small angle when the image carrier drum is stopped. A mode for a reverse direction of rotation is set. In this mode, the image carrier drum 202 is rotated in a reverse direction to a rotating direction i.e. a forward direction of the image carrier drum 202 during formation of the toner image on the drum. However, when the mode is set, the noise that originates from the vibrations of the cleaning blade 230 may be generated not only during the rotation of the drum in the forward direction but also during the rotation of the drum in the reverse direction. In the conventional image forming apparatus, noise tends to be generated particularly just before the image carrier drum 202 stops its rotation, and when the image carrier drum 202 performs operations of forward rotation, stop, reverse rotation, and stop, a loud noise is generated twice consecutively. However, by providing the damper 204 having the structure, inside the image carrier drum 202, it is possible to prevent generation of loud noise even during reverse rotation of the image carrier drum 202.

Following is the explanation of the image carrier drum 202 in which the damper 204 is fitted. As a photosensitive layer of the image carrier drum used in electrophotography, those as follows are known. That is, the photosensitive layer includes a photosensitive layer using an inorganic semiconductor material such as selenium and amorphous silicon, a photosensitive layer using an organic semiconductor material, and a photosensitive layer using a combination of the two. In recent years, the organic photosensitive layer has been used widely due to its low cost, a high degree of flexibility in photoreceptor designing, and non-polluting nature. The damper mentioned above can be fitted in the image carrier drum having either of the photosensitive layers.

As the organic photosensitive layer used in electrophotography, those as follows are known. That is, the organic photosensitive layer includes a photosensitive layer of photoconductive resins represented by polyvinyl carbazole (PVK), a charge transfer complex type photosensitive layer represented by PVK-TNF (2,4,7-trinitrofluorenone), a pigment dispersing type photosensitive layer represented by phthalocyanine binder, and a function separated type photosensitive layer used as a combination of charge generating material with charge carrying material. Especially, the function separated type photosensitive layer has been focused on. The mechanism of forming the electrostatic latent image in the function separated type photosensitive layer is as follows. That is, when light is irradiated after charging of the photosensitive layer, the light passes through a transparent charge carrying layer and is then absorbed by the charge generating material in the charge generating layer. The charge generating material that has absorbed the light generates charge carrier, and the charge carrier is injected in the charge carrying layer to move in the charge carrying layer according to an electric field created by charging. Then, an electrostatic latent image is formed due to neutralization of charges on the surface of the photosensitive layer. In the function separated type photosensitive layer, it is known and useful to use a combination of the charge carrying material that absorbs light mainly in the ultraviolet region with the charge generating material that absorbs light mainly in the visible region.

However, the organic photosensitive layer has poor mechanical and chemical durability, which is a known shortcoming. Most of the charge carrying materials is developed as low molecular compounds. However, since the low molecular compounds do not have a capacity to form a membrane independently, the compounds are used after being dispersed in and mixed with inactive high molecules. Generally, the charge carrying layer, formed of the low molecular charge carrying material and inactive high molecules, is soft and has poor mechanical durability. In the electrophotography process, mechanical load exerted by various parts coming in contact (developing, transfer paper, cleaning brush, and cleaning blade etc.) tends to break the layer easily due to repetitive use of the layer.

Therefore, the protective layer can be provided on the photoreceiving layer as a top layer made of these materials to protect the photosensitive layer and to improve the durability thereof. As explained above, adding of charge carrying materials to the protective layer is also effective, and an antioxidant can also be added if necessary.

Moreover, an intermediate layer can be provided between the photosensitive layer and the protective layer. Normally, a binder resin is used as a main component in the intermediate layer. Polyamide, alcohol-soluble nylon, water-soluble polyvinyl butyral, polyvinyl buteral, polyvinyl alcohol etc. are examples of the binder resin. The intermediate layer is formed by the normal coating method. The appropriate thickness of the intermediate layer is in a range of approximately 0.05 $\mu$m to 2 $\mu$m.

When the image carrier drum has the protective layer on its surface, the breaking of the photosensitive layer is suppressed. Due to this, the cleaning blade can be pressed against the image carrier drum with even stronger force. Therefore, it is possible to clean wax etc. in the toner that gets deposited on the image carrier drum when the toner having a low melting point is used. Moreover, the variation in the friction coefficient of the surface of the image carrier drum is reduced. That is, it is possible to have better cleaning and better noise prevention.

When filler is included in the protective layer, the breaking of the photosensitive layer can be suppressed reliably thereby further improving the effect of the protective layer.

When the charge carrying material is included in the photoelectric layer, the breaking of the photosensitive layer can be suppressed reliably thereby further improving the effect of the protective layer.

In the image forming apparatus in FIG. 15, the image forming module 218 is structured by integrally assembling the image carrier drum 202 and a plurality of image forming units used for forming the toner image on the drum 202. However, the image forming module 218 can be structured by integrally assembling at least the drum 202 and the cleaning blade 230 that cleans the surface of the drum 202 after transferring of the toner image. In such a case, values of resilience and Young's modulus etc. vary due to temperature and humidity of an area around the cleaning blade 230. When the temperature and humidity increase, the cleaning blade tends to vibrate easily and the image carrier drum tends to generate noise easily.

Therefore, it is useful to provide an environmental control unit to maintain at least either one of the temperature and the pressure of the image forming module at a predetermined value or below. Concretely, a sensor 203 that detects either of temperature and humidity or both is provided in the image forming module 218 as shown in FIG. 15. When the sensor 203 detects that either of temperature and pressure or both inside the image forming module 218 is a predetermined value or more, a fan (not shown) provided in the casing of the image forming apparatus starts. The fan blows air inside the image forming module 218 in the direction indicated by arrows B and cools down the cleaning blade 230. This reduces the generation of noise more effectively.

Figure 18:
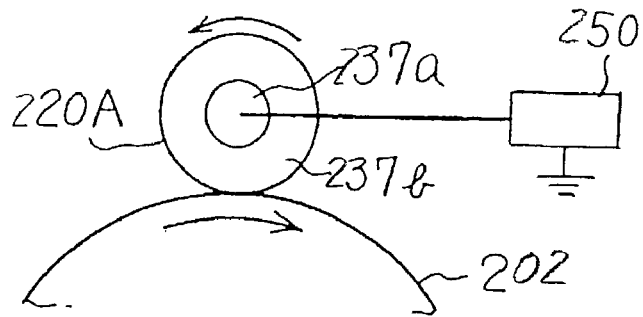
FIG. 18 illustrates a charging roller that is in contact with a surface of the image carrier drum.
Figure 19:
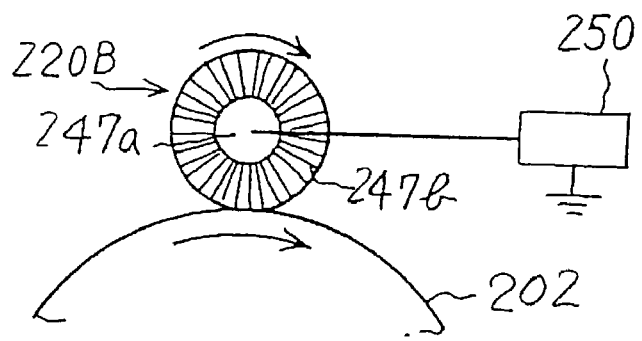
FIG. 19 illustrates a charging unit formed by a brush roller.
Figure 20:
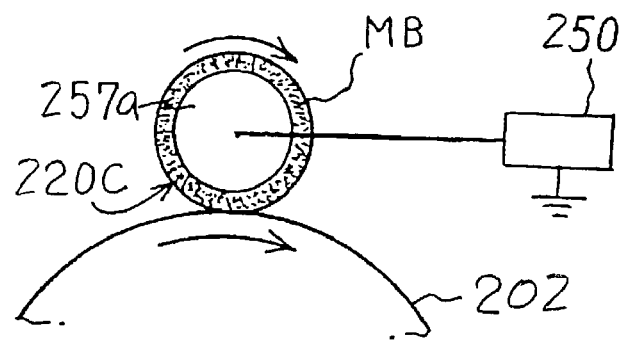
FIG. 20 illustrates a charging unit formed by a magnetic brush unit.

In the image forming apparatus shown in FIG. 15, the charging unit is formed with the charging roller 220 that is disposed close to the image carrier drum 202. The image carrier drum 202 with the damper inserted into it, can also be used in an image forming apparatus that uses any other type of charging units as shown in FIG. 18 to FIG. 20. Each of the charging units shown in FIG. 18 to FIG. 20 is a contact type charging unit that is in contact with the surface of the image carrier drum 202 formed with a photoreceptor drum that rotates in a direction of an arrow to charge the image carrier drum 202. Each of the charging units is formed with a charging roller 220A, a brush roller 220B, or a magnetic brush unit 220C.

The charging roller 220A shown in FIG. 18 is formed with a core metal 237a and a conductive rubber layer 237b fixed on its outer peripheral surface. Two ends of the core metal 237a are supported by bearings (not shown) such that the core metal can rotate freely. The charging roller 220A is pressed against the image carrier drum 202 by a pressurizing unit (not shown) with prescribed pressure and rotates following the rotation of the image carrier drum 202. Concretely, the rubber layer 237b having medium resistance of about $1 \times 10^5$ ohm-cm covers the core metal 237a having a diameter of 9 millimeters. A diameter of the charging roller 220A is 16 millimeters. The core metal 237a is connected to a power source 250, which applies a prescribed bias to the charging roller 220A. Due to application of the bias, the outer surface of the image carrier drum 202 is charged uniformly to a prescribed polarity and electric potential. The damper is fitted inside the image carrier drum 202. Due to the effect of the damper, the generation of noise in the image carrier drum is reduced even when the charging voltage in which ac voltage is superimposed on dc voltage is applied to the charging roller 220A.

In an example shown in FIG. 19, a brush 247b of the brush roller 220B is in contact with the surface of the image carrier drum 202 with a prescribed pressure so as to have a prescribed nip. The brush is made of any of carbon, copper sulfide, metal, and metallic oxides, and is subjected to conductivity processing. The brush is wound or stuck around a metal or any other core metal subjected to conductivity processing to form the charging roller (brush roller) 220B.

More specifically, a tape in which a conductive rayon fiber REC-B made by UNITICA CO., LTD. is used as a pile fabric, is wound spirally as the brush 247b around the core metal 247a with a diameter of 6 millimeters to form the brush roller 220B having an outer diameter of 14 millimeters and a length of 250 millimeters along the axial direction. Note that the core metal 247a also acts as an electrode. The brush has a density of 300 deniers/50 filaments and 155 threads per one square millimeter. The brush 202B is inserted into a pipe having a diameter of 12 millimeters by rotating in one direction and fitted in such a way that the brush and the pipe are concentric. Hair of the brush can be bent on one side by leaving the brush in a high temperature and high humidity atmosphere. The resistance value of the brush roller 220B is $1 \times 10^5$ ohms for an applied voltage of 100 volts.

This resistance value is calculated from the current that passes when the brush roller 220B is brought into contact with the metal drum having a diameter of 30 millimeters with a nip width of 3 millimeters and a voltage of 100 volts is applied to the core metal 247a. The resistance value of the brush roller has to be $10^4$ ohms or more so that even if a defective part of the low withstand voltage such as a pinhole is produced on the image carrier drum as a charged body, there is no poor charging of the charging nip due to an excessive leakage current in this part and defective image forming is prohibited. The resistance value of the brush roller has to be $10^7$ ohms or less to inject sufficient charge on the surface of the image carrier drum.

The material for the brush includes REC-C, REC-M1, REC-M10 in addition to REC-B made by UNITICA CO., LTD, SA-7 made by TORAY CO., LTD, Thunderon made by NIHON SANMO CO., LTD, Belltron made by KANEBO CO., LTD, Clacarbo made by KURARAY CO., LTD, a material obtained by dispersing carbon into rayon, and Lobal made by MITSUBISHI RAYON CO., LTD. It is preferable that a line of brush is in a range of 3 deniers to 10 deniers, and the brush is in a range of 10 filaments to 100 filaments per bunch, and has 80 threads to 600 threads per millimeter. The preferable length of brush hair is in a range of 1 millimeter to 10 millimeters.

The brush roller 220B in the example is driven to rotate at a prescribed circumferential velocity (speed of the surface) in a reverse direction (counter direction) to the rotating direction of the image carrier drum 202. The brush roller 220B is in contact with the surface of the image carrier drum 202 with a different speed as that of the drum. A power supply 250 applies a prescribed charging voltage to the brush roller 220B, and the rotating image carrier drum is charged uniformly to a prescribed polarity and electric potential by the brush roller in contact with the drum. In the example, the brush roller 220B carries out the contact charging to the image carrier drum dominantly by direct injection charging, and the surface of the image carrier drum is charged to almost the same electric potential as the applied charging voltage to the brush roller. The damper is fitted inside the image carrier drum 202 in FIG. 19 as well. Due to the effect of the damper, the generation of noise in the image carrier drum 202 is reduced even if the charging voltage in which ac voltage is superimposed on dc voltage is applied to the brush roller 220B.

In an example in FIG. 20, a charging unit that uses a magnetic brush is provided adjacent to the image carrier drum 202. A magnetic brush MB is arranged such that it is in contact with the peripheral surface of the image carrier drum 202 with a prescribed nip.

A magnetic brush unit 220C in the example includes a non-magnetic sleeve 257a that supports the magnetic brush MB and a magnetic roller (not shown) incorporated in the non-magnetic sleeve 257a. Various types of ferrite particles like Zn—Cu ferrite can be used as particles for the magnetic brush. More specifically, the magnetic brush is formed as follows. The Zn—Cu ferrite particles of an average particle size: 25 $\mu$m are mixed with Zn—Cu ferrite particles of an average particle size: 10 $\mu$m in the ratio of weights 1:0.05 respectively. The ferrite particles of an average particle size 25 $\mu$m which have peaks in respective positions of the average particle size, are coated with a resin layer of medium resistance to give magnetic particles. The sleeve 257a is coated with the coated magnetic particles by a thickness of 1 millimeter to form the magnetic brush.

The magnetic particles are carried on the sleeve 257a by magnetic force of the magnetic roller that is incorporated in the sleeve 257a. Such a magnetic brush MB forms a charging nip having a width of about 5 millimeters (width of the direction of rotation) between the magnetic brush MB and the image carrier drum 202, and enables to adjust the gap between the sleeve 257a that holds the magnetic particles and the image carrier drum 202 to about 500 $\mu$m.

Moreover, it is preferable that the non-magnetic sleeve 257a is rotated so that the surface of the sleeve 257a moves in the direction opposite to the direction of moving of the surface of the image carrier drum at a speed double with respect to the peripheral velocity of the image carrier drum. It is also preferable that the magnetic brush is made to scrape the surface of the image carrier drum, and that the image carrier drum and the magnetic brush are in uniform contact with each other. A prescribed charging voltage is applied to the sleeve 257a by the power source 250 and the image carrier drum is charged uniformly to a prescribed polarity and electric potential through the magnetic brush MB. The damper is fitted inside the image carrier drum 202 in FIG. 20 as well. Due to the effect of the damper, the generation of noise in the image carrier drum 202 is reduced even if the charging voltage in which ac voltage is superimposed on dc voltage is applied to the drum 202 by using a contact type charging unit like the magnetic brush unit 220C in the example.

The present invention can be applied to a color image forming apparatus in which plurality of image carrier drums, i.e. photoreceptor drums are lined up. Moreover, the present invention is also applicable to any types of image forming apparatuses like a printer, a facsimile, a copying machine, and a multifunction machine of these apparatuses.

Thus, the example of the image carrier drum that is formed with a photoreceptor drum and is provided with the damper inside the image carrier drum is explained here. However, even in a case of the image carrier drum formed with an intermediate transfer drum to which the toner image is transferred from the photoreceptor, the generation of noise from the intermediate transfer drum can be reduced effectively by providing the damper inside the intermediate transfer drum. Moreover, the generation of noise can be reduced by providing the damper inside the roller that supports the photoreceptor in the form of an endless belt and the intermediate transfer belt.

Thus, according to the second embodiment, the generation of noise can be effectively reduced even if the toner having a low melting point is used.

A third embodiment of this invention will be explained below.

Figure 21:
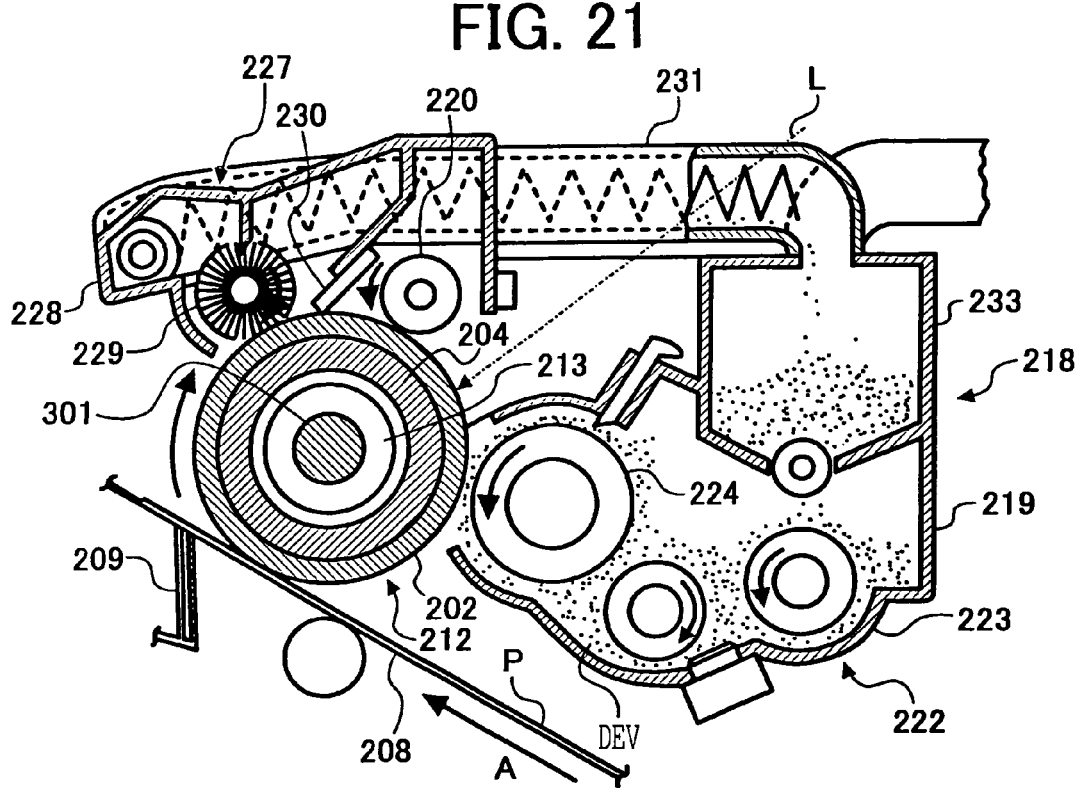
FIG. 21 is a schematic diagram of an image forming unit in an image forming apparatus according to a third embodiment of the present invention.

FIG. 21 is a cross section of an image forming unit of an image forming apparatus provided with an image carrier drum according to the third embodiment. An image carrier drum 202 in the figure is a photoreceptor drum which includes a photosensitive layer provided on an outer peripheral surface of a circular cylindrical tube made of a conductive metal like aluminum. The image carrier drum 202 is supported by a shaft 301 that extends through inside the image carrier drum 202 as explained later. Both ends of the shaft 301 along its length are supported by a case 219 of an image forming module 218. The image carrier drum 202 supported by the shaft 301 is rotated by a drive motor (not shown) in a clockwise direction as shown in FIG. 21. During rotation of the image carrier drum 202, a charging unit formed with a charging roller 220 rotatably supported by the case 219 rotates while being in contact with the outer peripheral surface of the image carrier drum 202. The surface of the image carrier drum 202 is charged to a prescribed polarity by applying a charging voltage to the charging roller 220.

A modulated laser beam L emitted from an exposing unit (not shown) is irradiated on the surface of the image carrier drum 202 after being charged to form an electrostatic latent image on the image carrier drum. The exposing unit is provided separately apart from the image forming module 218. This electrostatic latent image is visualized as a toner image by a developing unit 222. The toner image is carried on a transfer belt 208 and is transferred to a transfer paper P that travels in a direction of an arrow A by an action of a transfer brush 209. The toner image having been transferred to the transfer paper P is fixed on the transfer paper by a fixing unit (not shown). A residual toner on the image carrier drum after the transferring of the toner image is eliminated by combined action of a charging brush 229 and a cleaning blade 230 of a cleaning unit 227.

The developing unit 222 includes a developing case 223 that is formed with a part of the case 219 of the image forming module 218 and a developing roller 224 that is rotatably supported by the developing case 223. The developing case 223 contains developer DEV. The developer DEV is carried on the rotating developing roller 224 and transferred, and the electrostatic latent image is visualized by the transferred developer. In this case, a two-component developer, which includes toner and carrier, is used as the developer. When a decrease in toner density of the developer is detected, the toner is replenished from a toner container 233. The cleaning unit 227 includes a cleaning case 228 that is also formed with a part of the case 219 of the image forming module 218. The cleaning brush 229 and the cleaning blade 230 are supported by the cleaning case 228. The toner recovered from the image carrier drum 202 is returned to the toner container 233 through a toner carrier tube 231 connected to the case 219.

Thus, in the image forming apparatus shown in FIG. 21, the image carrier drum 202 and the image forming units provided around the drum 202 such as the charging roller 220, the developing roller 224, the cleaning brush 229, the cleaning blade 230 are integrally assembled to the case 219 and the image forming module 218 is formed thereby. The image forming module 218 is detachable from a casing (not shown) of the image forming apparatus and can be replaced by a new image forming module when the module reaches end of its life.

Figure 22:
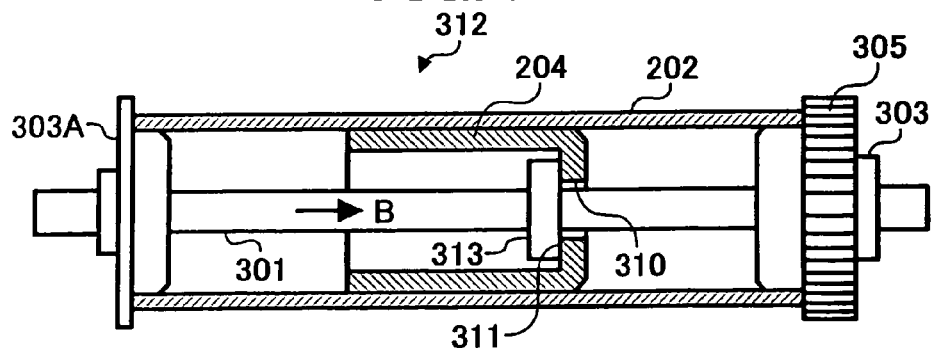
FIG. 22 is a longitudinal cross section of a cylinder unit in FIG. 21.

FIG. 22 is a longitudinal cross section of the image carrier drum 202. Ordinary flanges 303 and 303A are fitted to ends of the image carrier drum 202 in its axial direction of this figure. The shaft 301 passes through the flanges 303 and 303A and extends through inside the image carrier drum 202. The image carrier drum 202 is supported by the shaft 301 through the flanges 303 and 303A. The shaft 301 is disposed concentrically with the image carrier drum 202 and extends through the center of the image carrier drum 202.

Figure 23:
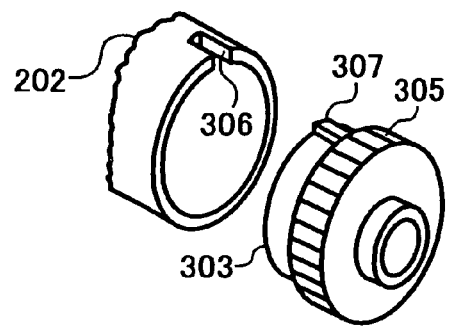
FIG. 23 is an exploded perspective view of an image carrier drum and a flange in FIG. 22.

A gear 305 is integrated on the outer periphery of the flange 303. A counter gear (not shown) engages with the gear 305. A drive motor (not shown) rotates the flange 303 by transmitting the rotations through the gear 305 and the counter gear. The rotations of the flange 303 are transmitted to the image carrier drum 202, and the image carrier drum 202 rotates around the axis of its center. As shown in FIG. 23, a notch 306 is formed at an edge of the image carrier drum 202. A protrusion 307 provided on the flange 303 is engaged in the notch 306 thereby transmitting the rotation of the flange 303 to the image carrier drum 202. The flanges 303 and 303A may be press fitted into the ends of the image carrier drum 202, or may be fixed to the image carrier drum 202 with an adhesive. The flanges 303 and 303A may also be engaged with the image carrier drum 202 by clearance fit. When the flanges 303 and 303A are engaged by the clearance fit, it is necessary to hold the flanges by using thrust stoppers (not shown), which are provided to stop the flanges 303 and 303A from moving in the axial direction of the image carrier drum 202 and coming off. A sidewall of the case 219 shown in FIG. 21 can be used as the thrust stopper.

The shaft 301 passing through the flanges 303 and 303A may be fixed to the flanges by press fit. The shaft 301 may also be engaged with the flanges 303 and 303A such that the flanges can rotate freely around the shaft 301. In the former case, the shaft 301 rotates together with the flange 303, flange 303A, and the image carrier drum 202 whereas in the latter case the shaft 301 does not rotate. In either of the cases, the shaft 301 is supported by the case 219 as shown in FIG. 21.

The charging roller 220 and the cleaning blade 230 are in contact with the outer peripheral surface of the image carrier drum 202 as shown in FIG. 21. When a charging voltage having ac voltage superimposed on dc voltage is applied to the charging roller 220, the charging roller 220 vibrates due to the application of the ac voltage. Further, the cleaning blade 230 vibrates due to stick-slip during rotation of the image carrier drum 202. These vibrations are transmitted to the drum 202, and the drum 202 vibrates. If these vibrations become strong, then noise is produced.

Therefore, a damper 204 is disposed inside the image carrier drum 202 of this embodiment as shown in FIG. 21 and FIG. 22. The damper 204 shown in the figures is in the form of a cup having almost U-shaped longitudinal cross sectional form. The shaft 301 passes through a hole 310 that is made in the bottom wall of the damper 204. The damper 204 can be made of an appropriate material like an elastic material, a rigid material such as rubber, resin, and metal, or a combination of these materials. The damper 204 having an outer diameter slightly smaller than an inner diameter of the image carrier drum 202 is used, and such a damper 204 may be fixed to the inner wall surface of the image carrier drum 202 with an adhesive. Alternatively, the damper 204 having an outer diameter before being inserted into the drum 202 that is slightly bigger than an inner diameter of the drum 202 is used. When such a damper 204 is inserted inside the drum 202, the damper 204 may be elastically deformed in the direction in which the diameter is contracted. Thus, the damper 204 may be pressed against the inner wall surface of the drum 202 and fixed to the drum 202.

Thus, a cylinder unit 312 is integrally formed with the cylinder (the image carrier drum 202 in the example), a shaft that supports the cylinder, and a damper that is disposed inside the cylinder. The shaft 301 passes through the cylinder and further extends. In the example shown in FIG. 22, the pair of flanges 303 and 303A is also included in the cylinder unit 312. The damper 204 is provided inside the image carrier drum 202, which makes it possible to reduce the vibrations in the image carrier drum 202 and effectively suppress the generation of noise.

The image carrier drum 202 goes on deteriorating with time and when it reaches end of its life, the image forming module 218 shown in FIG. 21 is removed from the body of the apparatus and replaced by a new image forming module. The image forming module 218 removed from the body of the apparatus is recycled. That is, the cylinder unit 212 is removed from the case 219 of the image forming module 218 and disassembled into components. The components that can be reused in the existing condition are reused as they are, and the other components are subjected to prescribed recycling processing and are provided for reuse.

To facilitate the recycling of the cylinder unit 212, i.e. to be able to remove the damper 204 from the image carrier drum 202, the cylinder unit 212 is structured as follows. As shown in FIG. 22, a protrusion 313 having a diameter bigger than that of the shaft 301 is integrated with the shaft 301. A portion 311 of the damper 204 facing the protrusion 313, is positioned such that the portion 311 is in contact with the protrusion 313. The flange 303A on the other side is pulled out from the shaft 301 and removed. In the case where the flange 303A is fixed to the image carrier drum 303 with an adhesive, the flange 303A is applied with force to break the adhesive and is separated from the shaft 301 and the image carrier drum 202.

Then, the shaft 301 is moved in the direction shown by an arrow B in FIG. 22, i.e. in the axial direction of the image carrier drum 202. When the shaft 301 is moved, the protrusion 313 that is fixed to the shaft 301 comes in contact with a portion 311 of the damper 204 (hereinafter "contacting portion") and pushes the area in the direction of the arrow B. Due to this, the damper 204 moves in the axial direction of the image carrier drum, i.e. the direction of the arrow B together with the shaft 301. In the case where the damper 204 is fixed to the inner wall surface of the image carrier drum 202 with an adhesive, the damper 204 is pushed in the direction of the arrow B to break the adhesive, and is moved in the direction of the arrow B.

Figure 24:
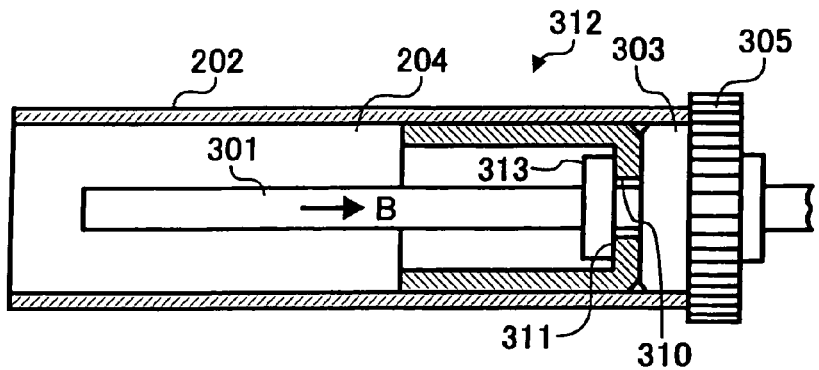
FIG. 24 is a cross section of a state when a shaft and a damper are moved from the state shown in FIG. 22.

While moving the damper 204, the shaft 301 slides with respect to the flange 303. As shown in FIG. 24, when the shaft 301 is moved further in the direction of the arrow B, the damper 204 moving together with the shaft 301 pushes the flange 303, and therefore the flange 303 is removed from the image carrier drum 202. In this case also, when the flange 303 is fixed to the image carrier drum 202 with an adhesive, by applying an external force to the flange, the adhesive is broken. Moreover, when the shaft 301 is moved further in the direction of the arrow B, the damper 204 is eventually removed from the image carrier drum 202. In the case where the flange 303 is fixed to the image carrier drum 202 by clearance fit, the flange 303 can be removed from the image carrier drum 202 before the damper 204 comes in contact with the flange 303. Thus, just by pulling out the shaft 301, the damper 204 and the flange 303 can be removed from the image carrier drum 202 thereby enabling disassemble of the cylinder unit with ease and at a low cost without using any special tools.

As explained above, the cylinder, the shaft 301, and the damper 204 are assembled such that when the shaft 301 is pulled out from the cylinder as the image carrier drum 202, the damper 204 moves in the axial direction of the cylinder together with the shaft 301 and is removed from the cylinder. Moreover, in the cylinder unit 312, the protrusion 313 protruding in the radial direction of the shaft 301 is provided on the shaft 301. The damper 204 has the contacting portion 311 that comes in contact with the protrusion 313 when the shaft 301 is pulled out from the cylinder. The protrusion 313 is brought into contact with the contacting portion 311 and the damper 204 is moved together with the shaft 301 thereby simplifying the structure of the cylinder unit 312.

Furthermore, the contacting portion 311 of the damper 204 is positioned at the front end in the movement direction of the damper 204. Therefore, if the damper 204 is made of an elastic material, the damper 204 is deformed by reducing its diameter when the shaft 301 and the damper 204 move in the direction of the arrow B, which allows the damper 204 to be easily moved inside the image carrier drum. Assume that the protrusion 313 fixed to the shaft 301 is structured such that the protrusion 313 pushes the rear end of the damper 204 made of an elastic material in the movement direction of the damper 204. The frictional force that acts between the damper 204 and the inner wall surface of the image carrier drum is exerted on the damper 204. Due to this frictional force, the damper 204 expands in the radial direction and cannot be moved smoothly. However, since the contacting portion 311 is at the front end of the damper 204 in the direction of its movement, there is no hindrance to the movement of the damper.

The shaft 301, the damper 204, the flange 303, and the flange 303A which are disassembled in the above manner, can be reused as they are only by cleaning these components. Moreover, since the damper 204 in the cylinder unit 312 is disposed in the space surrounded by the image carrier drum 202, the flange 303, and the flange 303A, the damper 204 is not contaminated by either of dust and toner during the use of the cylinder unit 312. Therefore, the damper 204 can also be reused without cleaning after it is separated from the image carrier drum.

The assembling of the cylinder unit 312 is also facilitated. For example, the damper 204 is disposed on the left side of the image carrier drum 202 in FIG. 22 and the shaft 301 on which the flanges 303 and 303A are not fixed is inserted inside the image carrier drum 202 from the left end of the drum 202. While inserting the shaft 301, the shaft 301 is passed through the hole 310 of the damper 204, and the contacting portion 311 of the damper 204 is pushed by the protrusion 313 provided on the shaft 301. While pressurizing the damper 204 in the direction of the arrow B in FIG. 22, the shaft 301 together with the damper 204 is inserted into the image carrier drum 202. Then, the flanges 303 and 303A are fitted to the ends of the shaft 301 and also fitted on the ends of the image carrier drum 202 thereby fitting the damper 204 inside the image carrier drum 202.

Figure 25:
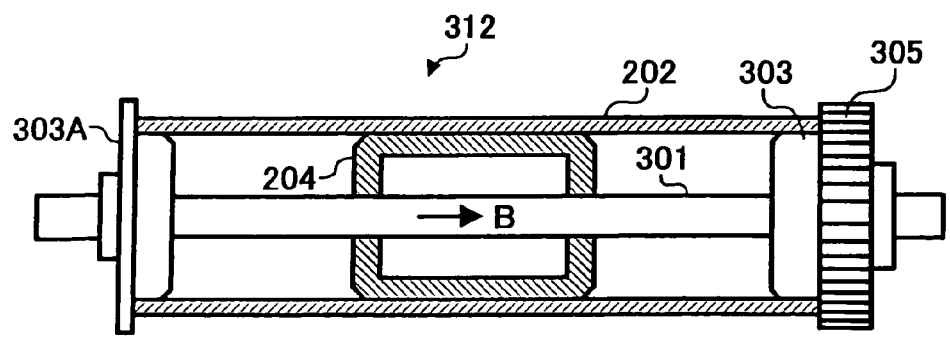
FIG. 25 is a cross section of another example of the damper.
Figure 26:
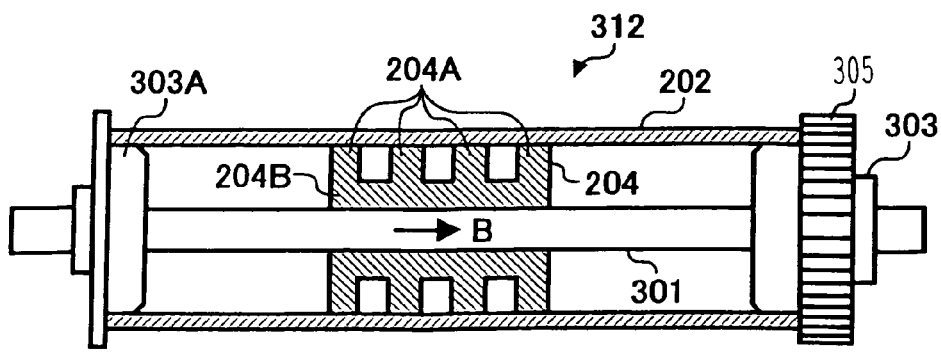
FIG. 26 is a cross section of still another example of the damper.
Figure 27:
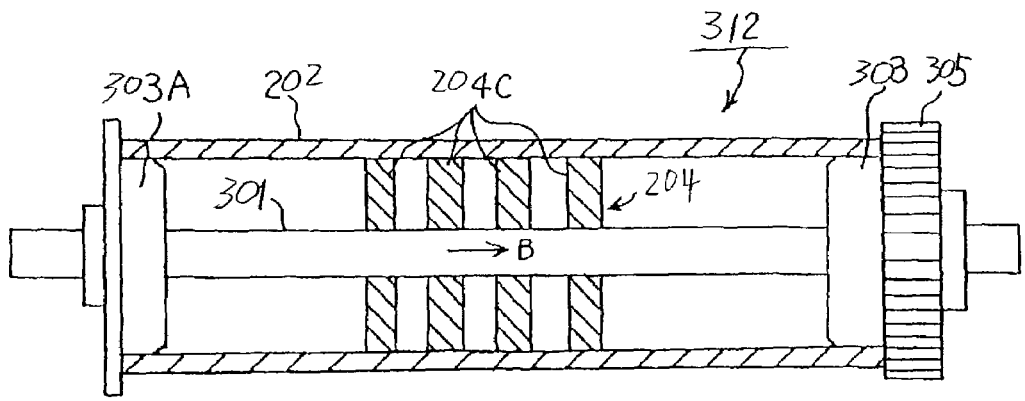
FIG. 27 is a cross section of still another example of the damper.

Further, as shown in FIG. 25 and FIG. 27, the damper 204 can also be integrally coupled to the shaft 301. FIG. 25 illustrates an example of fixing a hollow circular cylindrical shaped damper 204 to the shaft 301, and FIG. 26 illustrates an example of using a damper 204 in which a plurality of circular discs 204A are integrated with a base 204B and fixing the base 204B to the shaft 301. FIG. 27 illustrates an example of fixing a plurality of circular shaped discs 204C to the shaft 301 to form a damper 204.

For disassembling the components of cylinder units 312 shown in FIG. 25 to FIG. 27, when the shaft 301 is moved in the direction of the arrow B after the flange 303A is separated from the shaft 301 in the same manner as explained above, the damper 204 that is integrally coupled to the shaft 301 also moves with the shaft 301, which allows the flange 303 and the damper 204 to be separated from the image carrier drum 202. The rest of the structures shown in FIG. 25 to FIG. 27 are practically similar to those shown in FIG. 21 to FIG. 24.

The effect similar to that of the cylinder units 312 shown in FIG. 25 to FIG. 27 can be achieved also by fixing a solid cylindrical damper to the shaft 301. However, when the solid damper is moved inside the image carrier drum 202, the solid damper undergoes a considerable amount of frictional force from the inner wall surface of the image carrier drum 202, and therefore smooth movement of the damper becomes difficult. When the dampers 204, shown in FIG. 25 to FIG. 27, are made of an elastic material in particular, the dampers 204 undergo elastic deformation easily when they are moved inside the image carrier drum 202. Therefore, the frictional force exerted by the inner wall surface of the image carrier drum 202 decreases and the dampers 204 can be moved easily.

Moreover, in the example shown in FIG. 22, when the diameter of the image carrier drum 202 is small, the diameters of the damper 204 and the protrusion 313 also become smaller, and a contact area between the protrusion 313 and contacting portion 311 of the damper 204 becomes smaller. Therefore, when the shaft 301 is moved in the direction of the arrow B, the pressure per unit area of the contact surface between the protrusion 313 and the contacting portion 311 increases. Therefore, especially in the case of the damper 204 made of an elastic material, the portion of the damper 204 pushed by the protrusion 313 undergoes considerable elastic deformation. Due to the elastic deformation, the force is not conveyed properly from the protrusion 313 to the damper 204, and therefore the damper 204 may not be moved smoothly. To avoid this, the damper 204 is integrally coupled to the shaft 301 to make it move easily together with the shaft 301 when the shaft 301 is pulled out from the cylinder as shown in the examples in FIG. 25 to FIG. 27. Thus, the damper 204 can reliably be moved and can be removed from the image carrier drum 202 easily.

The cylinder unit 312 has a pair of flanges 303 and 303A fitted to the ends of the cylinder formed with the image carrier drum 202 in the axial direction. The cylinder is supported by the shaft 301 through these flanges 303 and 303A. The shape of the damper is set so that the damper 204 moves in the axial direction of the cylinder to come in contact with the flange 303 and pushes the flange 303, and then the flange 303 is removed from the cylinder. Therefore, as explained above, the flange 303 can be separated from the cylinder just by pulling out the shaft 301. Thus, the workability can be enhanced.

Figure 28:
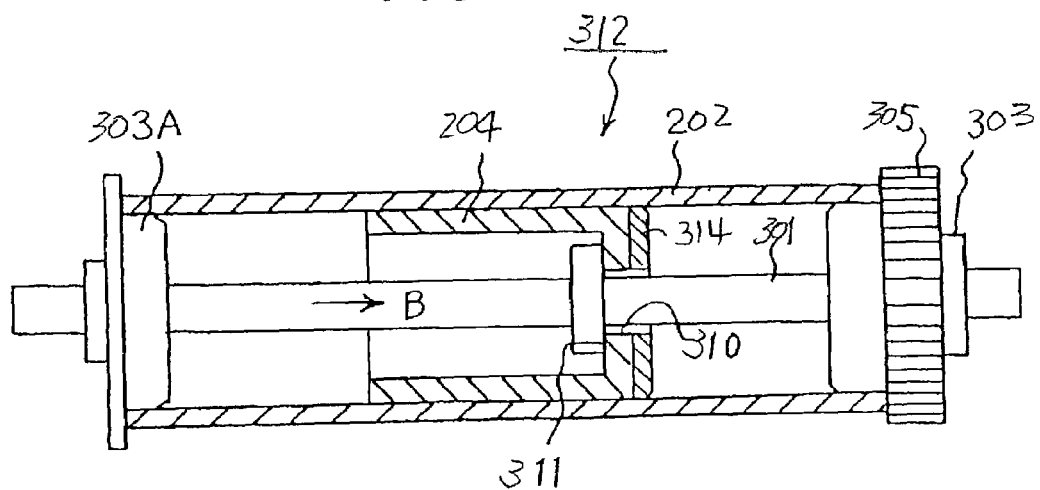
FIG. 28 is a cross section of still another example of the damper.

The damper 204 can be formed by an appropriate material as explained above. As shown in FIG. 28, in a case of pulling out the shaft 301 from the image carrier drum 202, if a portion 314 of the damper coming in contact with the flange 303 is made of a rigid material, by bringing the portion 314 of the damper into contact with the flange 303 and pressurizing the flange 303, the force can be appropriately conveyed to the flange 303. Thus, the flange can be separated easily from the image carrier drum 202. The portion 314 of the damper can be made of ABS resin or metal having a Young's modulus of about 2 to 3 GPa.

When the portion 314 of the damper is made of the rigid material, if the speed at which the shaft 301 is pulled out is high, the portion 314 of the damper impacts against the flange 303 and may damage the flange 303. In a case of such concern, the portion 314 of the damper coming in contact with the flanges 303 may be made of an elastic material. For example, the portion 314 of the damper is made of rubber having a Young's modulus of about 0.5 to 1.5 MPa. Thus, even when the portion 314 impacts against the flange 303, the damage of the flange 303 can be prevented and reused without any trouble.

Figure 29:
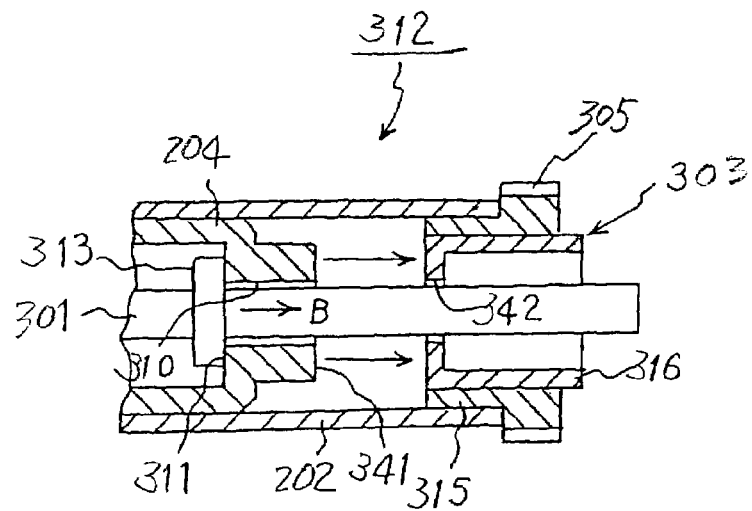
FIG. 29 is a cross section of a cylinder unit in which a flange having a first cylinder member and a second cylinder member is used.
Figure 30:
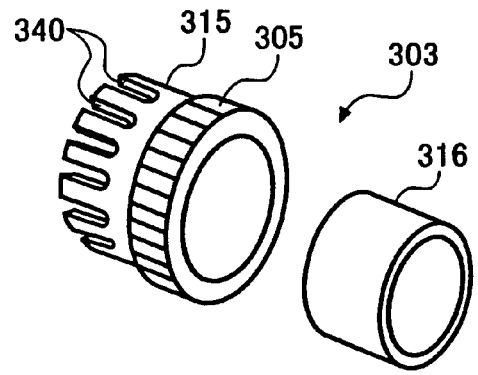
FIG. 30 is a perspective view of the first and the second cylinder members.
Figure 31:
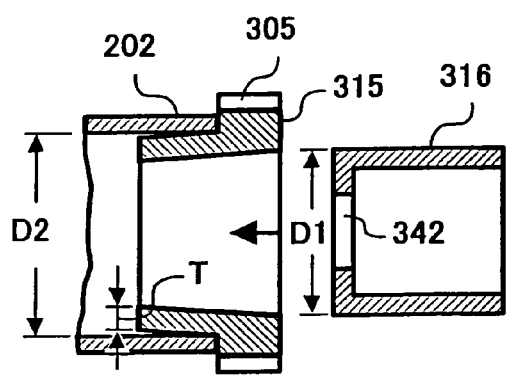
FIG. 31 is a cross section of a state while the first and the second cylinder members are assembled with the image carrier drum.

As shown in FIG. 29, the flange 303 can be structured to have a first cylinder member 315 that fits to the ends of the cylinder formed with the image carrier drum 202 in the axial direction and a second cylinder member 316 that fits into the first cylinder member 315. In this example, a gear 305 is formed on the first cylinder member 315. FIG. 30 is an exploded perspective view of the first cylinder member 315 and the second cylinder member 316. To fit the flange 303 to the image carrier drum 202, as shown in FIG. 31, the first cylinder member 315 is fitted into the end of the image carrier drum 202 and then the second cylinder member 316 is fitted into the first cylinder member 315. In this case, assume that an outer diameter of the second cylinder member 316 before it is fitted into the first cylinder member 315 is D1, a thickness of a part of the first cylinder member 315 that is inserted in the image carrier drum 202 is T, and an inner diameter of the image carrier drum 202 is D2. Each diameter and thickness are set so as to be D1+2T>D2. Thus, when the second cylinder member 316 is fitted in the first cylinder member 315 as shown in FIG. 29, the part of the first cylinder member 315 that is inserted into the image carrier drum 202 is in press contact with the inner wall surface of the image carrier drum 202 and the whole of the flange 303 is fixed to the image carrier drum 202.

Thus, the second cylinder member 316 is fitted in the first cylinder member 315, the first cylinder member 315 is made to be in pressed contact with the inner wall surface of the cylinder of the drum 202 and the flange is fixed on the cylinder. A plurality of slits 340 is formed in the first cylinder member 315 as shown in FIG. 30, and therefore the first cylinder member 315 can be pressed easily against the inner wall surface of the image carrier drum 202 by the second cylinder member 316. The shaft 301 is passed through a hole 342 in the second cylinder member 316 as shown in FIG. 29. The shaft 301 can be assembled with the image carrier drum 202 after fixing the flange 303 to the image carrier drum 202. The shaft 301 can also be inserted into the image carrier drum 202 before fixing the flange 303 to the image carrier drum 202. For the flange 303A (FIG. 22, FIG. 25), any of the flanges shown in FIG. 29 to FIG. 31 can be used.

When the flange 303 is structured in this manner, if the diameter of the front end of the damper 204 that faces the flange 303 is made smaller as shown in FIG. 29 and the damper 204 is moved together with the flange 303 in the direction of the arrow B, then it is preferable to structure such that a front end surface 341 of the front end comes in contact only with the second cylinder member 316. That is, the arrangement is made such that the damper 204 moves in an axial direction of the cylinder, the front end surface 341 of the damper 204 comes in contact only with the second cylinder member 316, and pushes the second cylinder member 316. With this arrangement, the second cylinder member 316 and the first cylinder member 315 are separated apart from each other due to the second cylinder member 316 pushed by the damper 204. Thus, the first cylinder member 315 and the second cylinder member 316 can be removed from the image carrier drum 202 without applying heavy load on them. This prevents causing of any damage to the first cylinder member 315 and the second cylinder member 316 thereby enabling their reuse without any processing after disassembling.

According to the embodiment, the damper 204 can be integrated with the cylinder including the image carrier drum 202 as an integral assembly by press fitting the damper on the inner wall surface of the cylinder due to elastic property of the damper 204. When the damper 204 is fixed to the image carrier drum 202 without using any adhesive material, the shaft 301 can be pulled out from the image carrier drum 202 easily thereby facilitating disassembling of the image carrier drum 202.

As explained above, the cylinder of the image carrier drum 202, the pair of the flanges 303 and 303A, and the shaft 301 are assembled together to rotate as an integrated assembly by press fitting the flanges 303 and 303A to the shaft 301 so as to be fixed to each other. Therefore, the flanges 303 and 303A cannot rotate around the shaft 301 since they are fixed. This prevents the sliding contact between the shaft 301 and the flanges 303 and 303A thereby preventing wearing away of the three. Thus, the shaft 301 and the flanges 303 and 303A can be reused after disassembling without carrying out any special machining process on them.

In the embodiment, the cylinder is the image carrier drum 202 on which a toner image is formed. In other words, although the cylinder in this example is a photoreceptor drum, when the cylinder is any device other than the image carrier drum, these structures can be employed. Concretely, the cylinder includes an image carrier drum that includes intermediate transfer body on which a toner image formed on the photoreceptor drum is transferred, a charging roller, a developing roller, transfer paper carrier roller, and any other cylinder formed as a support for a structure.

Moreover, the image forming apparatus in FIG. 21 includes the image carrier drum 202, and the image forming module that is assembled by integrating the image forming elements like the charging roller 220, the developing roller 224, the cleaning brush 229, and the cleaning blade 230 to form the image on the image carrier drum 202. It is a normal practice to reduce the size and weight of this image forming module to make it easy to handle.

Therefore, since small sized elements are used in the image forming module, the life of the image forming module is short. In the image forming apparatus in FIG. 21, an arrangement is made to replenish the toner container 233 with toner. However, when there is no arrangement for replenishment of the toner and when the structure is made such that the image forming module is to be replaced after the toner in the developing unit gets exhausted, the life of the image forming module becomes further short. The short life of the image forming module implies increased number of the image forming modules that are manufactured and are in the market. Therefore, it is important to facilitate the disassembling of the cylinder unit 312 and improve recycling. By structuring the cylinder unit 312 as mentioned in the embodiment, the cylinder unit 312 can be easily recycled, and the demand can be surely satisfied.

The cylinder unit can also be made discretely detachable from the main body of the image forming apparatus. In this case, it is a normal practice to set the life of the image carrier drum longer than that of the image forming unit that forms an image on the image carrier drum and to go on replacing the image carrier drum while the image forming apparatus is being used. In such a case also, by structuring the cylinder unit 312 as mentioned in this embodiment to improve recycling, it is possible to reuse the components of the cylinder unit 312 easily.

Thus, according to the third embodiment, the recycling is facilitated by structuring the cylinder unit such that it can be easily disassembled.

A fourth embodiment of this invention will be explained below.

Figure 32:
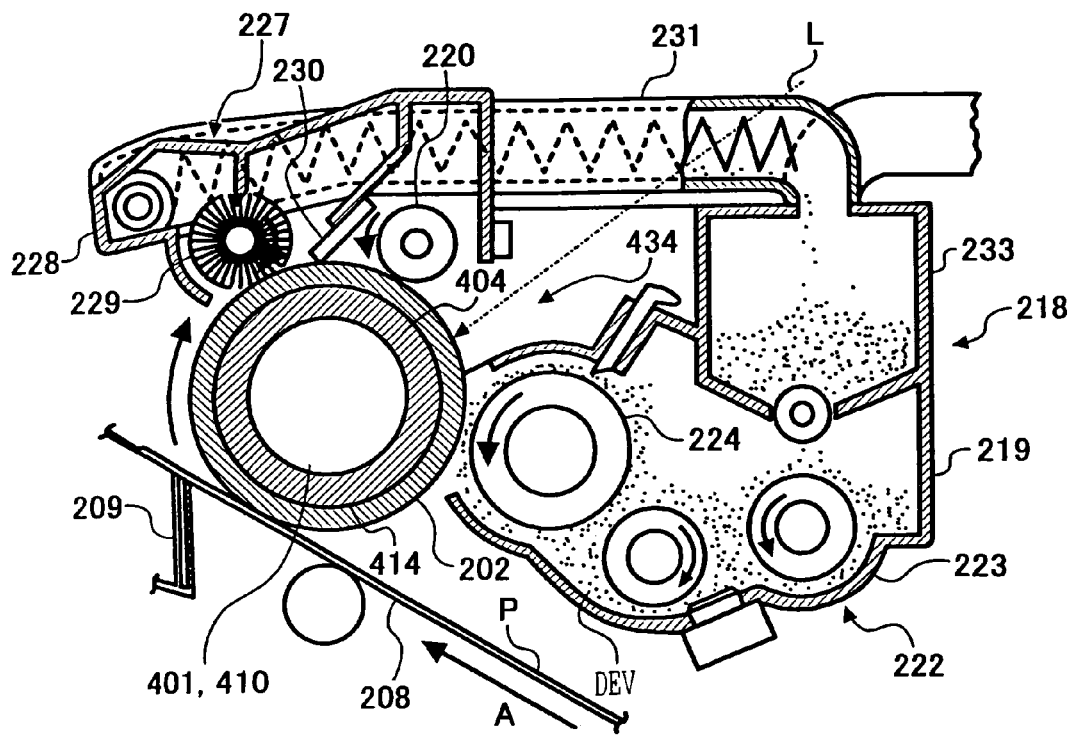
FIG. 32 is a schematic diagram of an image forming unit in an image forming apparatus according to a fourth embodiment of the present invention.

FIG. 32 is a schematic diagram of an image forming section of the image forming apparatus that uses an image carrier drum according to the fourth embodiment. An image carrier drum 202 in the figure is a photoreceptor drum which includes a circular tube made of a conductive metal like aluminum with a photosensitive layer provided on an outer peripheral surface. The image carrier drum 202 is rotatably supported by a case 219 of a process cartridge 218 and is rotated by a drive motor (not shown) in the clockwise direction in FIG. 32. A charging unit including a charging roller 220 rotatably supported by the case 219 is in contact with the image carrier drum 202 and rotates. By applying a charging voltage to the charging roller 220, a surface of the image carrier drum 202 is charged to a prescribed polarity.

A modulated laser beam L is irradiated on the surface of the image carrier drum 202 after being charged, the beam being emitted from an exposing unit (not shown) provided separately apart from the process cartridge. Thereby an electrostatic latent image is formed on the image carrier drum 202. This electrostatic latent image is visualized as a toner image by a developing unit 222. The toner image is carried on a transfer belt 208 and is transferred to a recording medium P such as a transfer paper that travels in a direction of an arrow A, by an action of a transfer brush 209 as an example of the transfer unit. The toner image having been transferred to the recording medium P is fixed on the recording medium by the fixing unit (not shown). A residual toner on the image carrier drum that remains after the transferring of the toner image is eliminated by combined action of a cleaning brush 229 and a cleaning blade 230 of a cleaning unit 227.

The developing unit 222 includes a developing case 223 formed with a part of the case 219 of the process cartridge 218 and a developing roller 224 rotatably supported by the developing case 223. The developing case 223 contains developer DEV. The rotating developing roller 224 carries and conveys the developer DEV. The conveyed developer visualizes the electrostatic latent image. In this case, a dry two-component developer including toner and carrier, is used as developer, and when a decrease in toner density of the developer is detected, the toner is replenished from a toner container.

The cleaning unit 227 includes the cleaning case 228 also formed with a part of the case 219 of the process cartridge 218. The cleaning brush 229 and the cleaning blade 230 are supported by the cleaning case 228. The toner recovered from the image carrier drum 202 is returned to the toner container 233 through a toner carrier tube 231 connected to the case 219.

Figure 33:
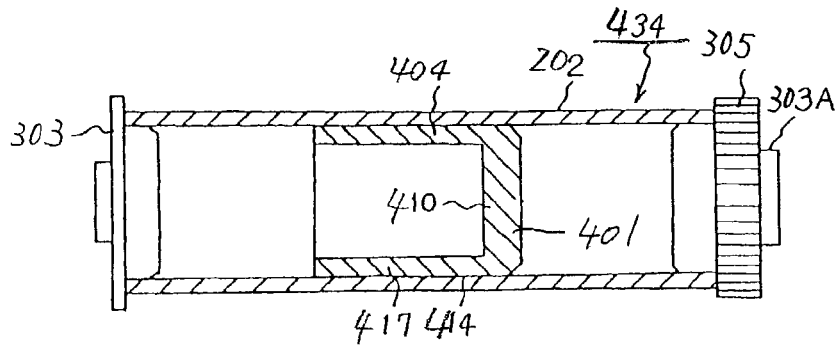
FIG. 33 is a longitudinal cross section of a drum unit in FIG. 32.

FIG. 33 is a longitudinal cross section of the image carrier drum 202. Flanges 303 and 303A are fitted at each end of the image carrier drum 202 in the axial direction. The flanges 303 and 303A are rotatably supported by the case 219 (FIG. 32), and the image carrier drum 202 is thereby rotatably supported by the case 219. It is possible to omit one of the flanges 303 and 303A. It is also possible to omit both the flanges, and both ends of the image carrier drum 202 can be rotatably supported directly by the case 219. When it is necessary to distinguish these flanges 303 and 303A from each other, the flange 303 is referred to as a first flange and the flange 303A is referred to as a second flange.

A gear 305 is integrated on the outer peripheral surface of the second flange 303A. A counter gear, which is not shown in the figure, is engaged with the gear 305. A drive motor, which is also not shown in the figure, rotates the second flange 303A by transmitting the rotations through these gears. The rotations of the flange 303A are transmitted to the image carrier drum 202, and the drum 202 rotates around the central axis of the flange 303A. A notch 306 is made at an end of the image carrier drum 202 as shown in FIG. 23. A protrusion 307 provided on the second flange 303A is engaged in the notch 306 thereby preventing relative rotation of the second flange 303A and the image carrier drum 202 and transmitting the rotation of the flange 303A to the image carrier drum 202.

The flanges 303 and 303A may be press fitted into openings at the ends of the image carrier drum 202 or may be fixed to the image carrier drum 202 with an adhesive. The flanges 303 and 303A can also be engaged with the image carrier drum by clearance fit. When the flanges 303 and 303A are engaged by clearance fit, it is necessary to hold the flanges by using thrust stoppers not shown in the figure, which are provided to stop the flanges 303 and 303A from moving in the axial direction of the image carrier drum 202 and from being removed from the drum 202. A sidewall of the case 219 shown in FIG. 32 can be used as a thrust stopper.

The charging roller 202 and the cleaning blade 230 are in contact with the outer peripheral surface of the image carrier drum 202 as shown in FIG. 32. When a charging voltage having ac voltage superimposed on dc voltage, is applied to the charging roller 220, the charging roller 220 vibrates due to the application of the ac voltage. Further, the cleaning blade 230 vibrates due to stick-slip during rotation of the image carrier drum 202. These vibrations are transmitted to the image carrier drum 202, due to which the drum 202 vibrates. When these vibrations become strong, noise is produced.

Therefore, a damper 404 is disposed inside the image carrier drum 202 of this example as shown in FIG. 32 and FIG. 33. The damper 404 includes a cylinder 417 having an outer peripheral surface 414 that is fixed to the inner peripheral surface of the image carrier drum 202, and a sidewall 410. The damper 404 is in the form of a cup having almost U-shaped longitudinal cross sectional form. An end of the damper 404 opposite to the sidewall 410 is kept open as an open end.

The damper 404 can be made of an appropriate material such as an elastic material, a rigid material such as rubber, resin, and metal, or a combination of these materials.

The damper 404 having an outer diameter slightly smaller than an inner diameter of the image carrier drum 202 may be used and fixed to the inner surface of the image carrier drum 202 with an adhesive. The damper 404 having an outer diameter before being inserted into the drum 202 that is slightly bigger than an inner diameter of the drum 202 may be used and inserted into the image carrier drum 202. When the damper 404 is inserted into the drum 202, the damper 404 undergoes elastic deformation in the direction of contraction of the diameter. Thus, the damper 404 can be fixed inside the image carrier drum 202 by making a pressed contact with an inner surface of the drum 202.

Thus, the damper 404 mounted inside the image carrier drum 202 is held inside the image carrier drum 202 due to the pressed contact with the inner surface of the image carrier drum 202. The pressed contact is attributed to the elasticity of the material of the damper. Alternatively, the damper 404 is fixed on the inner wall surface of the image carrier drum 202 with an adhesive. The damper 404 may also be fixed on the inner wall surface of the image carrier drum 202 using both elasticity and the adhesive.

The damper 404, which is provided inside the image carrier drum 202, reduces vibrations of the image carrier drum 202 and effectively suppresses the generation of noise.

Moreover, in the image forming apparatus of this example, an integrated drum unit 434 is structured by assembling the image carrier drum 202 with the damper 404 that is mounted inside the drum and the pair of flanges 303 and 303A. It is also possible to structure the integrated drum unit 434 without the flanges 303 and 303A. The drum unit 434 includes at least the image carrier drum 202 and the damper 404.

Further, in the image forming apparatus of this example, the process cartridge 218 is structured by assembling the drum unit 434 integrated with the image forming units such as the charging roller 220, the developing unit 222, the cleaning unit 227, which are disposed around the drum unit 434. Suitable image forming units can be selected for forming the process cartridge 218. In short, the process cartridge includes a drum unit and at least an image forming unit that forms a toner image on an image carrier drum of the drum unit. The process cartridge is detachable from the main body of the image forming apparatus. The image forming apparatus of this example includes either of the process cartridge 218 and the drum unit 434.

The image carrier drum 202 goes on deteriorating with time and when it reaches end of its life, the process cartridge 218 shown in FIG. 32 is removed from the main body of the image forming apparatus and replaced by a new process cartridge. The process cartridge 218 removed from the main body of the image forming apparatus is recycled. In recycling process, the image carrier drum 202 is removed from the case 219 of the process cartridge 219. The image carrier drum 202 and the components that are assembled together with the drum are disassembled. The components that can be reused in the existing condition are reused as they are, and the rest of the components are subjected to predetermined machining or treatment process, and are provided for reuse.

To facilitate the recycling of the image carrier drum 202, the damper 404, and the flanges 303 and 303A that are assembled with the drum, the following method is employed to easily assemble and disassemble these components.

Figure 34:
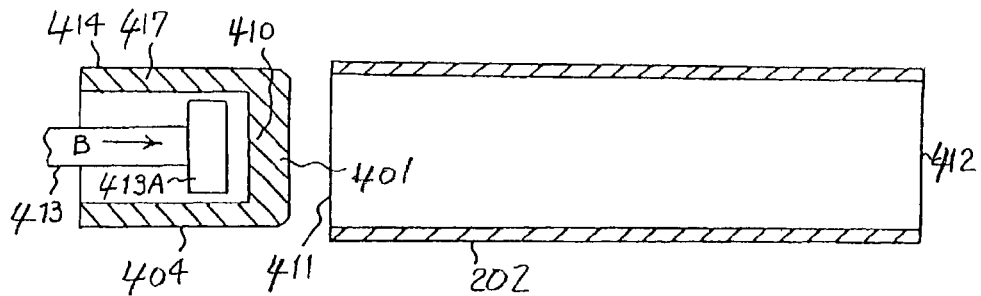
FIG. 34 is a cross section of a state before the damper is inserted into the image carrier drum.
Figure 35:
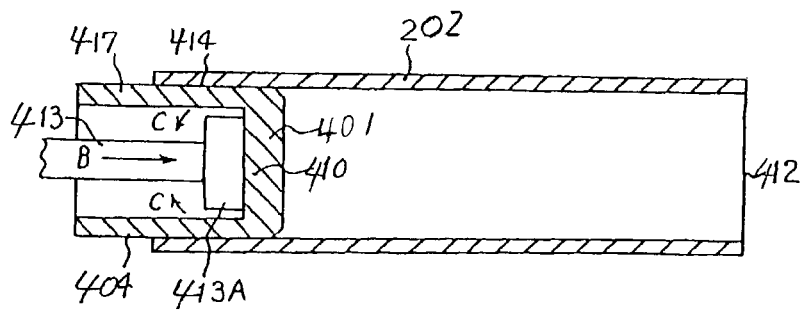
FIG. 35 is a cross section of a state after the damper is inserted into the image carrier drum.

FIG. 34 and FIG. 35 are cross sections of how a damper 404 is fixed to an image carrier drum 202. In the example shown here, an image carrier drum 202 without flanges 303 and 303A fixed on it is prepared. A sidewall 410 of the damper 404 is made to face an opening 411 on one end in the axial direction of the image carrier drum 202 as shown in FIG. 34. In the examples shown in FIG. 34 and FIG. 35, the damper 404 is made of an elastic material like rubber. An outer diameter of the damper 404 before being inserted into the image carrier drum 202 is set to be slightly bigger than an inner diameter of the image carrier drum 202.

In the state as shown in FIG. 34, a force imparting member 413 in the form of a rod is inserted into a cylinder 417 of the damper 404 in the direction of an arrow B from the opening end of the damper 404. A front-end 413A of the force imparting member 413 is brought into contact with the sidewall 410 of the damper 404 and the force imparting member 413 is pushed further in the direction of the arrow B along the axial direction of the image carrier drum 202. Thus, the damper 404 is thrust inside the image carrier drum 202 as shown in FIG. 35 and moved up to the position shown in FIG. 33. Then, the force imparting member 413 is pulled in a direction opposite to that of the arrow B and pulled out from the image carrier drum. Thus, the damper 404 having the outer diameter before being inserted into the drum 202 that is slightly bigger than an inner diameter of the image carrier drum 202, can be inserted and mounted inside the image carrier drum 202 with ease.

The damper 404 mounted inside the image carrier drum 202 is fixed to the image carrier drum 202 by pressing an outer peripheral surface 414 of the cylinder 417 against the inner peripheral surface of the drum 202 by the elasticity. The first flange 303 and the second flange 303A are fixed on the opening 411 and an opening 412 on both ends in the axial direction of the drum 202 respectively as shown in FIG. 33. The image carrier drum 202 thus formed is assembled with the case 219 shown in FIG. 32 and used.

The outer peripheral surface 414 of the damper 404 can also be fixed to the inner peripheral surface of the image carrier drum 202 with an adhesive. When the damper 404 is made of a rigid material, the damper 404 can be inserted into the image carrier drum 202 and fixed to the inner peripheral surface of the image carrier drum 202 in the same manner as explained above.

Figure 36:
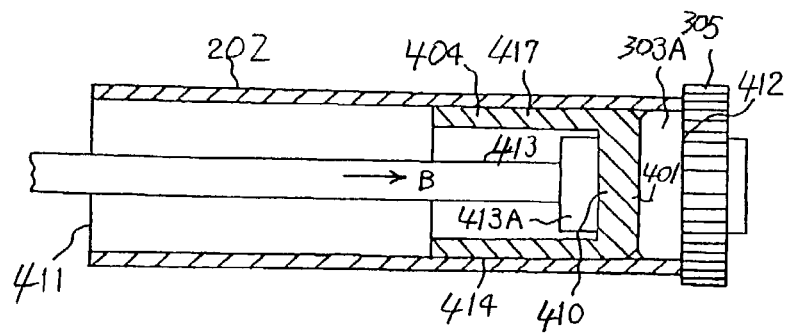
FIG. 36 is a cross section of a state when the damper has come in contact with the flange.
Figure 37:
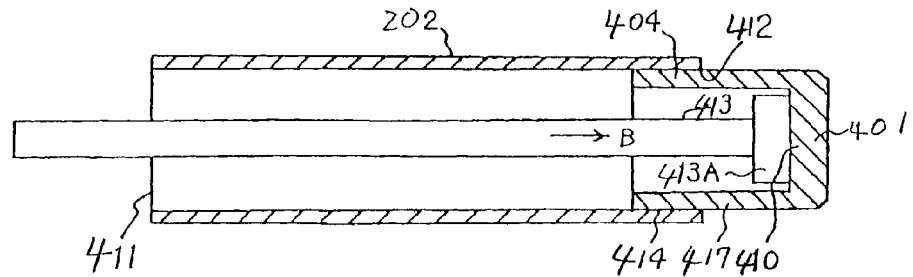
FIG. 37 is a cross section of a state when the damper is pushed out further after the flange is removed from the image carrier drum.

When the image carrier drum 202 and the damper 404 are to be disassembled, first of all the first flange 303 is removed from the image carrier drum 202 as shown in FIG. 33. When the flange 303 is fixed to the image carrier drum 202 with an adhesive, a force is applied to the flange 303 to break the adhesive, and the flange 303 is separated apart from the image carrier drum 202. Then, as shown in FIG. 36, the force imparting member 413 is inserted into the image carrier drum 202 from the opening 411, and further inserted into the cylinder 417 from the open end of the damper 404, and the front end 413A of the force imparting member 413 is brought into contact with the sidewall 410. The force imparting member 413 is further pushed in the direction of an arrow B. Due to this, the damper 404 moves in the axial direction of the image carrier drum 202 that is the direction of the arrow B. Even if the damper 404 is fixed to the inner peripheral surface of the image carrier drum 202 with an adhesive, the damper 404 can be moved in the direction of the arrow B by thrusting the damper 404 in the direction of the arrow B and breaking the adhesive.

Thus, by thrusting the force imparting member 413 in the direction of the arrow B, the sidewall 410 of the damper 404 that moves due to pressure applied by the force imparting member 413 comes in contact with the second flange 303A and pushes this flange as shown in FIG. 36. Therefore, the flange 303A is separated apart from the image carrier drum 202. In this case also, when the flange 303A is fixed to the image carrier drum 202 with an adhesive, pushing the flange 303A results in breaking the adhesive. When the force imparting member 413 is moved further in the direction of the arrow B, the damper 404 is also separated apart from the image carrier drum 202. Then, the force imparting member 413 is pulled out from the image carrier drum 202. Thus, the damper 404 and the flange 303A can be separated apart from the image carrier drum 202 just by pushing the damper 404 by the force imparting member 413 thereby enabling the disassembling of components at a low cost.

The damper 404 and the flanges 303 and 303A, having been disassembled in the above manner, require only cleaning for reuse. Moreover, since the damper 404 before being disassembled is disposed in the space surrounded by the image carrier drum 202, the flange 303 and the flange 303A, it is not contaminated by either of dust and toner during the use of the image carrier drum 202. Therefore, the damper 404 can also be reused without cleaning after it is separated from the image carrier drum.

As explained above, in the method for inserting and removing the damper into and from the image carrier drum of this example, the damper 404 is inserted into the image carrier drum 202 from the opening 411 on one end in the axial direction of the image carrier drum 202. The damper 404 is mounted inside the image carrier drum 202 and is removed from the opening 412 on the other end in the axial direction of the image carrier drum 202. The drum unit 434 includes the image carrier drum 202 and the damper 404. More specifically, the damper 404 is inserted into the image carrier drum 202 from the opening 411 on one end in the axial direction of the drum 202, mounted inside the image carrier drum 202, and then removed from the image carrier drum 202 through the opening 412 on the other end in the axial direction of the drum 202.

Based on the method as explained above, the damper 404 can be mounted inside the image carrier drum 202 or can be removed from the drum 202 by carrying out simple operation thereby facilitating the recycling process. Only the same operation is required for mounting and removing the damper 404.

Besides, according to the method for inserting and removing the damper into and from the image carrier drum of this example, the damper 404 is moved in the axial direction of the image carrier drum 202 by exerting an external force on the damper 404 by the force imparting member 413 and mounted inside the image carrier drum 202. Similarly, the damper 404 is moved inside the image carrier drum 202 in its axial direction by exerting an external force by the force imparting member 413 and is removed from the image carrier drum. The damper 404 is applied with an external force exerted by the force imparting member 413, is moved inside the image carrier drum 202 in its axial direction, and is mounted inside the image carrier drum 202. The damper 404 is applied with an external force exerted by the force imparting member 413, is moved inside the image carrier drum 202 in its axial direction, and is removed from the image carrier drum. Thus, operating the force imparting member 413 enables the damper 404 to be inserted into and removed from the image carrier drum 202 in a simple manner.

Moreover, when being inserted into and removed from the image carrier drum 202, the damper 404 moves inside the image carrier drum 202 in the axial direction of the drum. This direction is simply called a movement direction. The sidewall 410 of the damper 404 is integrated in the front end of the movement direction of the cylinder 417 of the damper 404. The force imparting member 413 is in contact and engaged with the sidewall 410 and pushes the damper. Thus, the sidewall 410 of the damper 404 forms an engaging portion with which the force imparting member 413 is engaged. Hereinafter, reference numeral 401 is assigned to this engaging portion formed with the sidewall 410.

As explained above, the damper 404 of this example includes the engaging portion 401 with which the force imparting member 413 is engaged on the front end of the movement direction when the damper 404 moves inside the image carrier drum 202 in the axial direction of the drum 202. The force imparting member 413 exerts an external force on the engaging portion 401 in the direction of movement of the damper 404 and moves the damper 404 in the axial direction of the image carrier drum 202.

Thus, at least a part of the outer diameter of the damper 404 can be made to contract by the external force applied by the force imparting member 413 to the engaging portion 401 in the axial direction of the image carrier drum 202. Therefore, the damper 404 can be moved smoothly inside the image carrier drum 202. In other words, the damper 404 shown in the figure is made of an elastic material and the outer diameter of the damper 404 before insertion is set to be slightly bigger that the inner diameter of the image carrier drum 202. Therefore, when the damper 404 is pushed slightly in the direction of the arrow B by the force imparting member 413 as shown in FIG. 35, the damper 404 tends to stop for a while due to the frictional force acting between the inner peripheral surface of the image carrier drum 202 and the outer peripheral surface 414 of the damper 404. However, by further pushing the engaging portion 401 by the force imparting member 413, the damper 404 made of an elastic material tends to be extended in the axial direction, and the damper 404 undergoes elastic deformation in the direction of contraction of the diameter as shown by an arrow C in FIG. 35. Therefore, the damper 404 can be moved smoothly. Similar deformation occurs when the damper 404 is pushed out from the image carrier drum.

When the force imparting member 413 pushes the rear end of the damper 404 in its axial direction and the damper 404 is made of an elastic material, the frictional force acting between the damper 404 and the inner peripheral surface of the image carrier drum 202 is exerted on the damper 404. Therefore, the damper 404 expands in the radial thereby hindering the smooth movement of the damper 404. However, disposing the engaging portion 401 on the front end in the direction of movement of the damper 404 prevents such an inconvenience.

In the example explained above, the damper 404 is pushed by the force imparting member 413 in the axial direction of the image carrier drum 202 and is mounted inside the image carrier drum 202. Similarly, the damper 404 is pushed by the force imparting member 413 in the axial direction and is removed from the image carrier drum 202. The engaging portion 401 of the damper 404 is pushed by the force imparting member 413 from one end to the other end of the image carrier drum 202 to move the damper 404 inside the drum 202.

Figure 38:
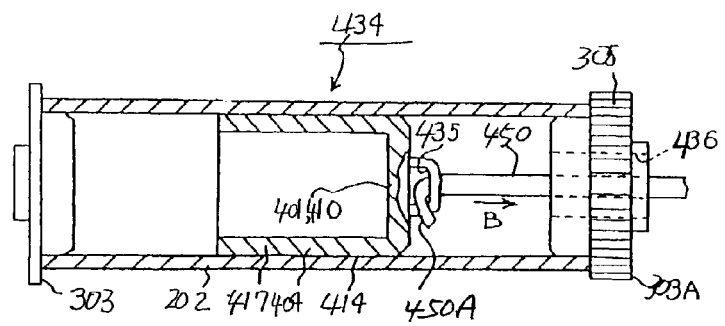
FIG. 38 is a cross section of an example of inserting and removing the damper into and from the image carrier drum by pulling the damper by a force imparting member.

On the other hand, an engaging portion of a damper can be pulled by a force imparting member from one end to the other end of the image carrier drum 202 to move the damper inside the drum 202. FIG. 38 is a cross section of an example of how a damper 404 is pulled out from an image carrier drum 202. A sidewall 410 of this damper 404 i.e. an engaging portion 401 has an engagement hole 435. A hook 450A is provided at a front end of a force imparting member 450 which is inserted inside the image carrier drum 202 through a hole 436 at the center of the flange 303A. The hook 450A is engaged in the engagement hole 435. By pulling the force imparting member 450 in the direction of an arrow B, the damper 404 can be removed from inside of the image carrier drum 202. In this case as well, the damper 404 pushes the flange 303A, and therefore the flange 303A can be removed from the image carrier drum 202. When the damper 404 is inserted into the image carrier drum 202, with a flange 303 separated apart from the image carrier drum 202, the hook 450A of the force imparting member 450 is engaged in the engagement hole 435 of the damper 404 and the damper 404 is pulled in the direction of the arrow B.

The rest of the structure other than the drum unit 434 shown in FIG. 38 can also be structured similar to the drum unit explained earlier. In the case of the drum unit shown in FIG. 38, an external force is exerted by the force imparting member 450 on the engaging portion 401 in the axial direction of the image carrier drum 202 to contract at least a part of the outer diameter of the damper 404. Therefore, the damper 404 can be made to move smoothly inside the image carrier drum 202.

Figure 39:
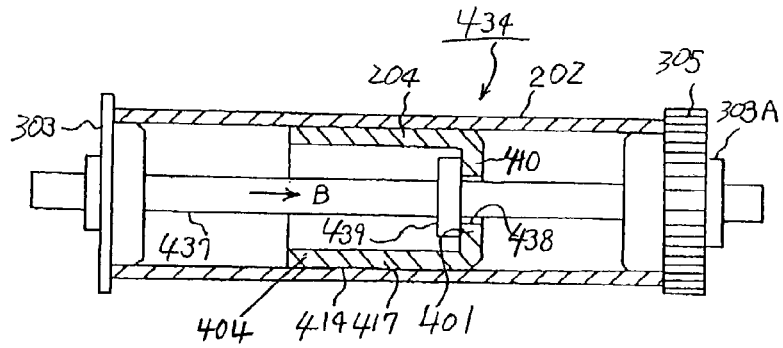
FIG. 39 is a longitudinal cross section of another example of the drum unit.

In the example explained above, as a force imparting member that moves the damper 404 inside the image carrier drum 202, an exclusively made force imparting member 450 (450A) is used. However, as this force imparting member, a shaft disposed inside the image carrier drum and supporting the drum can also be used. FIG. 39 is a cross section of an example of such type of force imparting member. In a drum unit 434 in the figure, a shaft 437 passes through an image carrier drum 202 and is press fitted into flanges 330 and 330A. A damper 404 shown in FIG. 39 is similar to the damper 404 explained in the earlier example. The damper 404 in FIG. 39 includes a cylinder 417 that has an outer peripheral surface fixed to an inner peripheral surface of the image carrier drum 202 and a sidewall 410 that is integrated on the front end in the movement direction of the cylinder 417. The sidewall 410 has an engaging portion 401. Moreover, the engaging portion 401 is formed by the sidewall 410 of the damper 404 that is disposed inside the image carrier drum 202. The engaging portion 401 has a hole 438 having a diameter bigger than that of the shaft 437 that supports the image carrier drum 202. The shaft 437 passes through the hole 438.

The shaft 437 is rotatably supported by the case 219 of the process cartridge 218 shown in FIG. 32. The shaft 437 is a component of the process cartridge 218. Moreover, the shaft 437 has a bigger diameter portion 439, which can be engaged with the engaging portion 401 of the damper 404.

Following is a procedure for assembling the damper 404 inside the image carrier drum 202. The damper 404 is disposed on the left side of the image carrier drum 202 in FIG. 39. The shaft 437 that is without the flanges 303 and 303A fixed is inserted into the drum 202 from the opening on the left end of the drum 202. The shaft 437 is further passed through the hole 438 in the damper 404. The engaging portion 401 of the damper 404 is pushed by the bigger diameter portion 439 of the shaft 437, and the damper 404 is pushed in the direction of the arrow B in FIG. 39. While the damper 404 is pushed, the shaft 437 together with the damper 404 is inserted inside the image carrier drum 202. Then, the flanges 303 and 303A are fitted on the ends of the shaft 437 and also on the openings at the ends of the image carrier drum 202. Thus, the damper 404 is mounted inside the image carrier drum 202.

Figure 40:
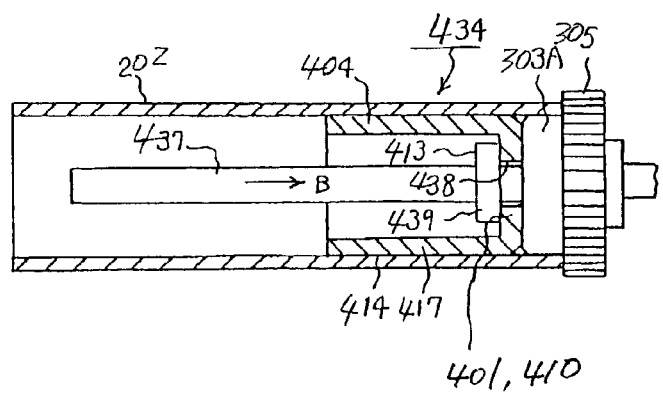
FIG. 40 is a cross section of a state after the shaft and the damper are moved from positions shown in FIG. 39.

When the damper 404 is to be removed from the image carrier drum 202, the first flange 303 is pulled out from the shaft 437 first, and the shaft 437 is made to move in the direction shown by the arrow B in FIG. 39, i.e. in the axial direction of the image carrier drum 202. The bigger diameter portion 439 of the shaft 437 comes in contact with the engaging portion 401 of the damper 404 and pushes the portion 401 in the direction of the arrow B. Due to this, the damper 404 moves in the axial direction of the image carrier drum i.e. in the direction of the arrow B together with the shaft 437. When the damper 404 is fixed to the inner peripheral surface of the image carrier drum with an adhesive, the damper 404 is pushed in the direction of the arrow B thereby breaking the adhesive to allow the damper 404 to be moved further in the direction of the arrow B. While doing this, the shaft 437 slides with respect to the second flange 303A. When the shaft 437 is continued to be moved in the direction of the arrow B, the damper 404 moving together with the shaft 437 pushes the second flange 303A thereby separating the flange 303A apart from the image carrier drum 202 as shown in FIG. 40. When the shaft 437 is moved further in the direction of the arrow B, the damper 404 is also separated apart from the image carrier drum 202. When the flange 303A is fitted to the image carrier drum 202 by clearance fit, the flange 303A can also be separated from the image carrier drum 202 before the damper 404 comes in contact with the flange 303A.

The structure can also be made such that the shaft 437 is supported by the main body of the image forming apparatus, the shaft 437 is left on the main body of the image forming apparatus, and the drum unit 434 is pulled out from the shaft 437 and can be fitted to the shaft 437 again. In such a case, the drum unit 434 is removed from the main body of the image forming apparatus. Then, as shown in FIG. 34 to FIG. 37, the damper 404 is removed from inside of the image carrier drum 202 using an exclusive force imparting member 413, or the damper 404 is mounted inside the drum 202 using the exclusive force imparting member 413. Thus, the damper 404 can be easily inserted into and removed from the image carrier drum 202.

The rest of the structure of the drum unit 434 apart from those shown in FIG. 39 and FIG. 40 is similar to the structure shown in FIG. 32 to FIG. 37.

Figure 41:
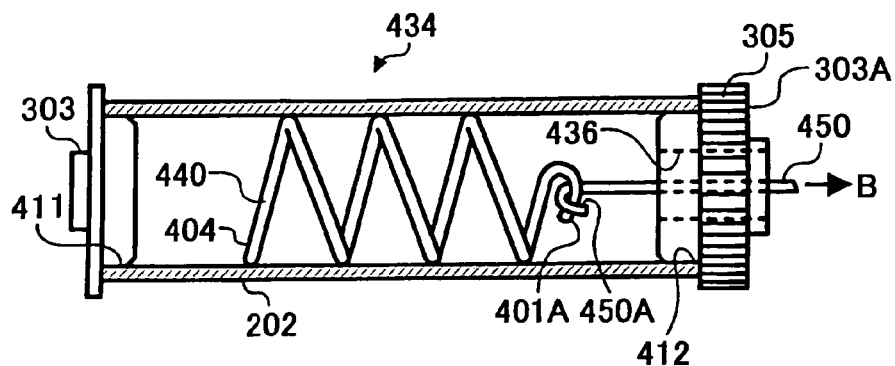
FIG. 41 is a cross section of a drum unit in which the damper is formed by a compression coil spring.

The damper 404 can also be formed by a compression coil spring 440 as shown in FIG. 41. Due to its elastic nature, the compression coil spring 440 is in pressed contact with the inner peripheral surface of the image carrier drum 202. Alternatively, the compression coil spring 440 can also be fixed to the inner peripheral surface of the image carrier drum 202 with an adhesive.

The damper 404 formed by the compression coil spring 440 is to be inserted into the image carrier drum 202 by following method. The first flange 303 is separated from the image carrier drum 202, and a hook 450A of a force imparting member 450 is engaged with an engaging portion 401A at one end of the compression coil spring 440. The force imparting member 450 is pulled in the direction of an arrow B thereby inserting the damper 404 into the image carrier drum 202 from an opening 411 on one end in the axial direction of the drum 202.

When the damper 404 formed by the compression coil spring 440 is to be removed, the compression coil spring 440 is pulled by the force imparting member 450 in the direction of the arrow B in the same manner as explained above. Thus, the damper 404 formed by the compression coil spring 440 can be removed from the image carrier drum 202 through an opening 412 on the other end in the axial direction of the image carrier drum 202. In this case, the compression coil spring 440 pushes the second flange 303A thereby removing the flange 303A from the image carrier drum 202. The rest of the structure can be formed similarly to the example mentioned above. An external force is exerted on the engaging portion 401A in the axial direction of the image carrier drum 202 by the force imparting member 450 to reduce at least a part of an outer diameter of the compression coil spring 440, and the compression coil spring 440 can be easily moved inside the image carrier drum 202. This action is similar to that in other structures.

Thus, as mentioned in the examples above, at least a portion of the damper that is in contact with the inner wall surface of the image carrier drum 202 is formed by an elastic material. The damper 404 makes a pressed contact with the inner wall surface of the image carrier drum 202 by the elastic nature i.e. restoring force, and is held inside the drum 202. When the damper 404 is fixed to the image carrier drum 202 without using an adhesive, it can be moved easily in the axial direction inside the image carrier drum 202.

In the example shown in FIG. 41, when the damper 404 that is to be removed from the image carrier drum 202 is moved inside the drum 202, the damper 404 pushes the flange 303A fitted on the opening 412 on one end in the axial direction of the image carrier drum 202 and separates the flange 303A apart from the image carrier drum 202. Thus, the flange 303 can be separated apart from the image carrier drum 202 just by pushing action by the damper 404, which makes it possible to enhance the workability.

When the flange 303A is fitted to the image carrier drum 202 by either of press fit and clearance fit without using an adhesive, the flange 303A can be removed from the drum 202 when the damper 404 is removed from the drum 202. The flange 303A can be removed by using a small amount of force and without any damage caused to it.

Figure 42:
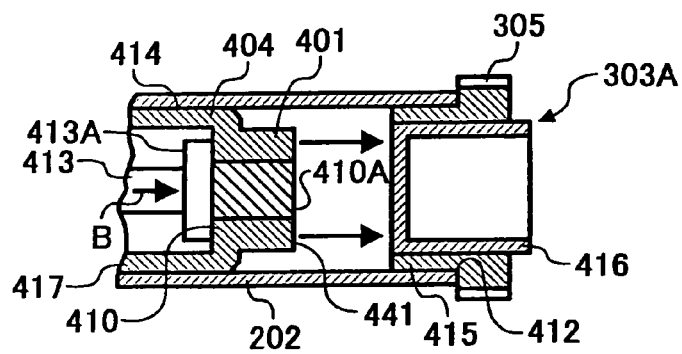
FIG. 42 is a cross section of an example of using the flange having a first and a second flange members.

Moreover, as shown in FIG. 42, the second flange 303A can be structured such that it has a cylindrical first flange member 415 that fits in the opening 412 at the end in the axial direction of the image carrier drum 202 and a second flange member 416 that fits in the first flange member 415. In this example, a gear 305 is formed on the first flange member 415. This is similar to the case in the exploded perspective view in FIG. 30. Dimensions of flanges are basically the same as the dimensions in FIG. 31.

This structure enables to disengage the second flange member 416 from the first flange member 415 using a small amount of force by pushing the second flange member 416 by the damper 404. Thus, the flange members 415 and 416 can be separated apart easily from the image carrier drum 202 without exerting considerable force. This prevents damage to the first flange member 415 and the second flange member 416 and these flanges can be reused in the existing condition. This structure can be also used when the force imparting member is formed by the shaft 437 or when the force imparting member is structured as shown in FIG. 38 and FIG. 41.

As shown in FIG. 42, it is also possible to form at least a part 410A of a sidewall 410 of the damper 404 that pushes the second flange member 416, with a rigid material like metal. Due to such a structure, the force exerted by the force imparting member 413 can be transmitted directly to the second flange member 416, and the second flange member 416 can be removed easily from the first flange member 415.

Figure 43:
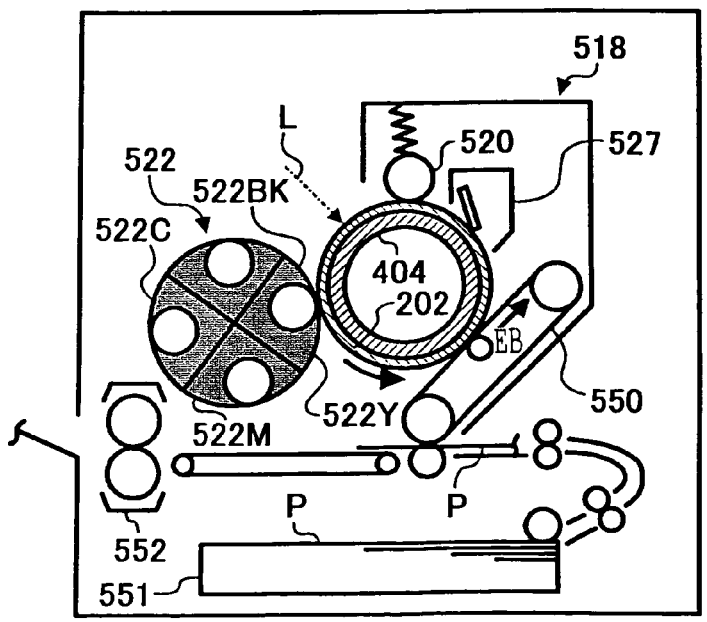
FIG. 43 is schematic cross section of another example of the image forming apparatus.
Figure 44:
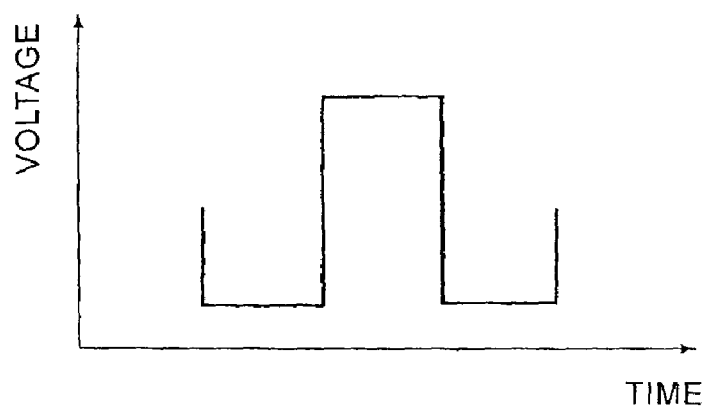
FIG. 44 is a graph of an example of a developing bias.
Figure 45:
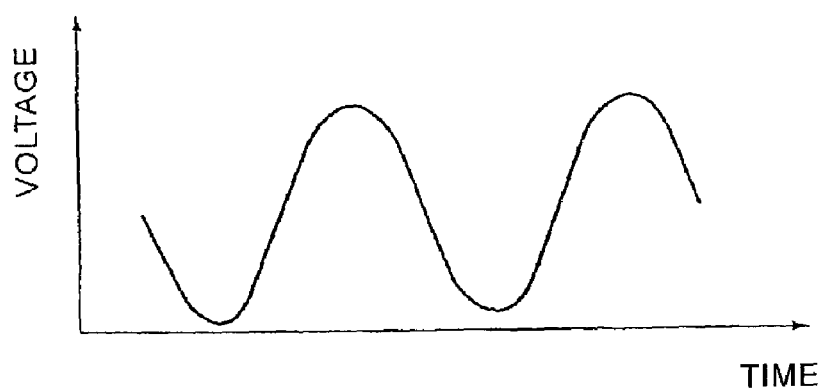
FIG. 45 is a graph of another example of the developing bias.
Figure 46:
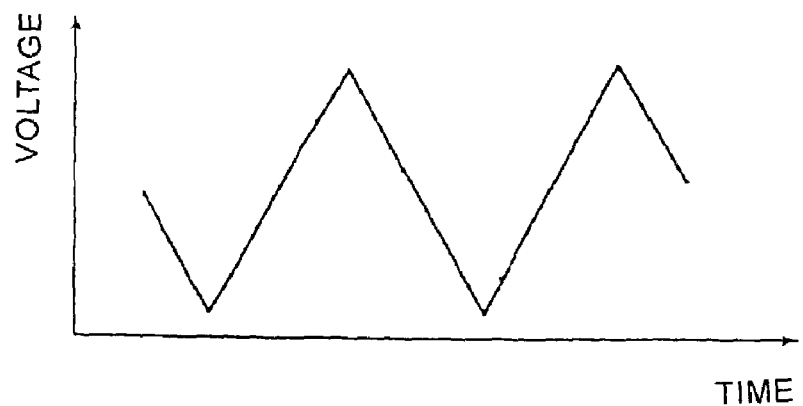
FIG. 46 is a graph of still another example of the developing bias.

The other structures in the examples shown in FIG. 42 to FIG. 44 are similar to the examples explained above.

In the image forming apparatus shown in FIG. 32, the drum unit 434 and the image forming units such as the charging roller 220, the developing unit 222, the cleaning unit 227 which form an image on the image carrier drum 202 are integrally assembled to the process cartridge 218. Therefore, when the process cartridge 218 reaches end of its life, the cartridge may be replaced thereby facilitating maintenance of the image forming apparatus.

It is a normal practice to reduce the size and weight of the process cartridge to make it easy to handle. Due to use of small sized components in the process cartridge, the life of the process cartridge is short. In the image forming apparatus in FIG. 32, an arrangement is made to replenish the toner container 233 with toner. However, if there is no such an arrangement for replenishment of the toner and the structure is made such that the process cartridge is replaced after the developing unit is run out of the toner, the life of the process cartridge becomes further shorter. The short life of the process cartridge implies an increased number of process cartridges that are made and are in the market. Therefore, it is important to facilitate the disassembling of the image carrier drum 202, the damper 404, and the flanges 303 and 303A to improve recycling. This can be done in a reliable manner by assembling or disassembling the image carrier drum 202, the damper 404, and the flanges 303 and 303A as mentioned in the embodiment to enable easy recycling.

The image forming apparatus shown in FIG. 32 is structured such that a transferred toner image can be fixed on the recording medium P at comparatively low temperature and a toner having a low melting point is used to enable conservation of energy. Concretely, the toner having a low melting point is used in the developing unit to enable the fixing of the toner image in the fixing unit at comparatively low surface temperature of the fixing roller, for example 145° C. The image forming apparatus forms a toner image on the image carrier drum using a toner having an outflow start temperature less than or equal to 120° C., preferably in a range of 99° C. to 102° C., measured by flow tester method. The measurement of outflow start temperature by the flow tester method is already explained above and hence omitted here.

A case of using the toner having a low melting point tends to generate noise easily as compared to a case of using a toner having a high melting point. It is not quite sure why the use of the toner having a low melting point increases the noise. However, It is considered that additive like wax contained in the toner tends to stick to the surface of the image carrier drum. Since the amount of the additive deposited becomes non-uniform according to an image pattern, a component like the cleaning blade, which is in contact with the surface of the image carrier drum, does not move uniformly. Therefore, it is thought that loud noise is produced in the image carrier drum due to vibrations caused by non-uniform movement of the cleaning blade.

Therefore, it is desirable to use the damper 404 as explained earlier, which is made of a material having a tangent of loss tan δ greater than or equal to 0.5. The tangent of loss tan δ is a tangent of a phase angle δ (loss angle) of stress and strain in a material. The greater the value of the tangent of loss tan δ, the greater the damping effect is. Considering the characteristics of this type of damping material, the damper 404 made of the material having a tangent of loss tan δ greater than or equal to 0.5 is provided inside the image carrier drum 202 to effectively damp the rotating drum 202. By using the toner having a low melting point, it is possible to reduce the noise generated in the rotating image carrier drum 202 during image formation to an extremely low level. A rubber material such as butyl rubber and nitrile rubber can be used as a material that has the tangent of loss tan δ greater than or equal to 0.5.

When a toner including a metallic salt of high fatty acid like zinc stearate is used for the image forming apparatus, a part of the toner gets deposited on the surface of the image carrier drum 202. Due to the toner deposited on the surface, the coefficient of friction of the cleaning blade 230 decreases thereby smoothening sliding of an edge of the cleaning blade 230. This reduces vibrations in the cleaning blade 230 and improves the prevention of noise considerably.

The present invention can be applied to an image forming apparatus of any form apart from that mentioned in FIG. 32. It can also be applied to an image forming apparatus shown in FIG. 43. In the image forming apparatus shown in FIG. 43, a charging roller 520 charges an image carrier drum 202 rotating in the direction of an arrow. The charged surface of the drum 202 is irradiated with a laser beam L emitted from an exposing unit (not shown) to form a first electrostatic latent image on the image carrier drum 202. The electrostatic latent image is visualized as a yellow toner image by a yellow developing device 522Y in the developing unit 522. The yellow toner image is then transferred to an intermediate transfer belt 550 that is rotating in the direction of an arrow EB. A cleaning unit 527 cleans the surface of the image carrier drum after transferring of the yellow image.

Similarly, a second electrostatic latent image is formed on the image carrier drum 202. The latent image is visualized as a magenta toner image by a magenta developing device 522M in the developing unit 522. This toner image is then transferred to the intermediate transfer belt 550 and is superimposed on the yellow toner image, which has already been transferred. In a similar way, a cyan toner image and a black toner image are sequentially formed on the image carrier drum 202 by a cyan developing device 522C and a black developing device 522BK in the developing unit 522 respectively, and these toner images are superposedly transferred to the intermediate transfer belt 550.

The superimposed toner images transferred to the intermediate transfer belt 550 are then transferred to a recording medium P that is fed from a paper feeding unit 551. When the recording medium passes through a fixing unit 552, the toner images are fixed on the recording medium.

A damper 404 is mounted in the image carrier drum 202 of this image forming apparatus. The damper 404 is inserted into the image carrier drum 202 and then removed in the same manner as explained above. In a case of the image forming unit in FIG. 43, a process cartridge 518 can be formed by assembling the image carrier drum 202, at least one image forming unit for forming a toner image on the image forming drum, and the intermediate transfer belt 550.

Thus, the embodiments in which the image carrier drum is formed by a photoreceptor drum are explained above. These structures can also be used when the image carrier drum is formed by an intermediate transfer drum on which a toner image is transferred from the photoreceptor.

As explained above, according to the present invention, the vibration absorber is disposed on the side opposite to the surface facing the unit in which the bias characteristics for the latent image carrier are set. Therefore, due to the bias characteristics, the vibration absorber that is in contact with the latent image carrier absorbs a part of the vibrations in the latent image carrier, which is caused by the vibrating electric field generated when ac voltage is applied. This enables to reduce the resonance in the latent image carrier, thereby preventing noise. Even if the latent image carrier is either of a belt and a thin-walled cylinder in particular, noise can be prevented without increasing the mass and without complicating the structure of the latent image carrier.

Further, the vibration absorber is in the form of a roller and the strong vibration absorbing material is provided either on the surface of or inside the roller, and therefore even if the roller comes in contact with the latent image carrier, the propagation of vibrations to the latent image carrier is prevented. Thus, the noise due to resonance in the latent image carrier is prevented.

Moreover, since the drive roller is used as the vibration absorber when the latent image carrier is in the form of a belt, a damper can be used for a material in firm contact with the latent image carrier. This facilitates the absorption of vibrations generated in the latent image carrier and enables to reduce the resonance in the latent image carrier by using the existing structure.

When the latent image carrier is a belt, the vibration absorber is provided on the opposite side to the surface of the supporting plate which is in contact with the latent image carrier. The supporting plate is made of a rigid body in the form of a flat plate and is in contact with the belt. Therefore, the vibration absorber absorbs the vibrations generated in the belt without obstructing the movement, and resonance in the latent image carrier can be reduced.

Since the vibration absorber is disposed in a position opposite to the unit in which the bias characteristics for the latent image carrier are set, the resonance can be reduced in the most efficient manner at the origin of resonance in the latent image carrier due to the bias characteristics.

When the latent image carrier is a substrate in the form of a thin belt and has a photosensitive layer on the surface of the substrate, the substrate is made of a material that absorbs strong vibrations. Therefore, the substrate can reduce it's own vibrations and there is no need to have a special arrangement for damping and hence no extra cost.

By setting the value of the tangent of loss tan δ which affects the damping effect to be greater than or equal to 0.5, the frequency of resonance can be changed to the frequency band in which high frequency sound harsh to ears is not produced. Therefore, even when the noise is generated from the latent image carrier, the same effect as that of reducing the noise can be achieved.

Since the vibration absorber is in the solid cylindrical form, it is possible to change the resonance frequency of the latent image carrier to the low frequency band efficiently by using the difference in mass, unlike the hollow cylindrical form. Thus, the resonance caused by the vibrations of the latent image carrier can be prevented and noise can be reduced in efficient manner.

It is possible to reduce the material cost by using the vibration absorber in the hollow cylindrical form. In a case of the structure that leads to the reduction in the material cost, in other words, even in a case where it is difficult to decrease the resonance frequency due to the mass unlike a case of the solid cylindrical form, deterioration of the damping effect can be prevented reliably by setting the value of the tangent of loss tan δ, which affects the damping effect, to be greater than or equal to 0.6.

Moreover, since the vibration absorber is fitted inside the latent image carrier by either of press fitting and fixing by an adhesive, it is thoroughly integrated with the latent image carrier thereby reducing the resonance in the latent image carrier in efficient manner.

The generation of noise can be reduced effectively by using a toner having a low melting point.

The cylinder unit can be disassembled easily thereby facilitating recycling.

The image carrier drum and the damper can be disassembled easily thereby facilitating recycling.

The present document incorporates by reference the entire contents of Japanese priority documents, 2002-169218 filed in Japan on Jun. 10, 2002, 2002-170655 filed in Japan on Jun. 11, 2002, 2002-181552 filed in Japan on Jun. 21, 2002, 2002-195224 filed in Japan on Jul. 3, 2002 and 2003-113709 filed in Japan on Apr. 18, 2003.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A drum unit, comprising:
   a cylinder;
   a shaft that extends inside and supports the cylinder; and
   a damper disposed inside the cylinder in pressed contact with an inner wall surface of the cylinder and fixed to the inner wall due to elasticity, wherein
   the cylinder, the shaft, and the damper are assembled such that when the shaft is pulled out from the cylinder, the damper moves in the axial direction of the cylinder together with the shaft.

2. The drum unit according to claim 1, wherein the damper is coupled together with the shaft such that the damper can move together with the shaft when the shaft is pulled out from the cylinder.

3. The drum unit according to claim 1, wherein the cylinder, a pair of flanges, and the shaft are assembled together to rotate as an integrated assembly.

4. The drum unit according to claim 1, wherein the cylinder includes an image carrier drum.

5. A drum unit, comprising:
   a cylinder;
   a shaft that extends inside and supports the cylinder; and
   a damper disposed inside the cylinder, wherein
   the cylinder, the shaft, and the damper are assembled such that when the shaft is pulled out from the cylinder, the damper moves in the axial direction of the cylinder together with the shaft and is removed from the cylinder;
   wherein the shaft has a protrusion in radial direction and away from a center of the shaft, the damper has a contacting portion that comes in contact with the protrusion when the shaft is pulled out from the cylinder.

6. The drum unit according to claim 5, wherein the contacting portion is in a front end of the direction of movement of the damper.

7. A drum unit, comprising:
   a cylinder;
   a shaft that extends inside and supports the cylinder; and
   a damper disposed inside the cylinder, wherein
   the cylinder, the shaft, and the damper are assembled such that when the shaft is pulled out from the cylinder, the damper moves in the axial direction of the cylinder together with the shaft and is removed from the cylinder;
   wherein the mechanism is such that each end in the axial direction of the cylinder has a pair of flanges fitted respectively, the cylinder is supported by the shaft through these flanges, the damper moves in the axial direction of the cylinder and comes in contact with one of the flanges, and the flange is separated apart from the cylinder by pushing.

8. The drum unit according to claim 7, wherein the damper that comes in contact with the flange is made of a rigid body.

9. The drum unit according to claim 7, wherein the damper that comes in contact with the flange is made of an elastic body.

10. The drum unit according to claim 7, wherein one of the flanges has a first cylinder member that fits at the end of the axial direction of the cylinder, a second cylinder member fitted in the first cylinder member that presses the first cylinder member against an inner wall surface of the cylinder, the damper moves in the axial direction of the cylinder, and a front end surface of the damper comes in contact with only the second cylinder member out of the two cylinder members and presses the second cylinder member.

11. The drum unit according to claim 7, wherein the cylinder, the pair of flanges, and the shaft are assembled together to rotate as an integrated assembly.

12. An image forming module, comprising:

an image carrier drum;

a shaft that extends inside and supports the drum;

a damper disposed inside the drum in pressed contact with an inner wall surface of the drum and fixed to the inner wall surface due to elasticity, wherein the drum, the shaft, and the damper are assembled such that when the shaft is pulled out from the drum, the damper moves in the axial direction of the drum together with the shaft; and an image forming element that forms an image on the drum, wherein the image carrier drum and the image forming element are assembled together as an integrated assembly.

13. An image forming apparatus comprising:

an image carrier drum;

a shaft that extends inside and supports the drum; and a damper disposed inside the drum in pressed contact with an inner wall surface of the drum and fixed to the inner wall surface due to elasticity, wherein the drum, the shaft, and the damper are assembled such that when the shaft is pulled out from the drum, the damper moves in the axial direction of the drum together with the shaft.

14. An image carrier drum assembly, comprising:

an image carrier drum;

a shaft that extends inside and supports the image carrier drum; and a damper disposed inside the image carrier drum, wherein the damper is configured to have a tangent of loss tan δ of at least 0.5.

* * * * *